United States Patent
Palanisamy et al.

(10) Patent No.: US 12,436,757 B2
(45) Date of Patent: Oct. 7, 2025

(54) ONBOARDING OF CUSTOMERS FROM SINGLE TENANT TO MULTI-TENANT CLOUD-NATIVE INTEGRATION SERVER

(71) Applicant: Oracle International Corporation, Redwood Shores, CA (US)

(72) Inventors: Muthukumar S. Palanisamy, Bangalore (IN); Venkatesh Mohanram, Englewood, CO (US); Renukaradhya Haroketanahalli Dakshinamurthy, Bangalore (IN); Joseph Lawrence Raja, Santa Clara, CA (US); Mohamed Aariff, Santa Clara, CA (US); Adinarayana Bellala, Bengaluru (IN); Rajan Modi, Highlands Ranch, CO (US); Gurunathan Mookaiah, Sivaganga (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 161 days.

(21) Appl. No.: 18/483,779

(22) Filed: Oct. 10, 2023

(65) Prior Publication Data
US 2025/0117208 A1 Apr. 10, 2025

(51) Int. Cl.
G06F 9/44 (2018.01)
G06F 8/65 (2018.01)
H04L 41/082 (2022.01)

(52) U.S. Cl.
CPC .............. *G06F 8/65* (2013.01); *H04L 41/082* (2013.01)

(58) Field of Classification Search
CPC ................................ G06F 8/65; H04L 41/082
See application file for complete search history.

(56) References Cited

U.S. PATENT DOCUMENTS

| | | | |
|---|---|---|---|
| 9,569,193 B2 * | 2/2017 | Pallamreddy | G06F 8/65 |
| 11,200,095 B2 | 12/2021 | Garaga et al. | |
| 11,645,066 B2 * | 5/2023 | Jiang | G06F 8/65 |
| | | | 717/168 |
| 11,669,321 B2 | 6/2023 | Srinivasan et al. | |
| 2014/0149591 A1 * | 5/2014 | Bhattacharya | G06F 9/5072 |
| | | | 709/226 |

(Continued)

*Primary Examiner* — Qamrun Nahar
(74) *Attorney, Agent, or Firm* — Kilpatrick Townsend & Stockton LLP

(57) ABSTRACT

Techniques are disclosed herein for onboarding users from a single tenant cloud environment to a multi-tenant cloud environment. In one aspect, a method is provided that includes in response to an eligibility status check indicating that a first cloud service instance running a first version of a cloud service in a first cloud environment is eligible for the upgrade, exporting a copy of data from the first cloud service instance to a common storage device, provisioning a second cloud service instance running on the second version of the cloud service in a second cloud environment, importing the first copy of the data from the common storage device to the second cloud service instance, and activating the second cloud service instance to run the second version of the cloud service. During the exporting, provisioning, and importing the first cloud service instance continues to run the first version of the cloud service.

20 Claims, 14 Drawing Sheets

(56) References Cited

U.S. PATENT DOCUMENTS

| | | | |
|---|---|---|---|
| 2014/0278808 A1* | 9/2014 | Iyoob | G06Q 30/0206 |
| | | | 705/7.35 |
| 2016/0019636 A1* | 1/2016 | Adapalli | H04L 41/5054 |
| | | | 705/26.81 |
| 2018/0316552 A1* | 11/2018 | Subramani Nadar | G06F 8/65 |
| 2022/0244949 A1* | 8/2022 | Iqbal | G06F 8/65 |
| 2022/0326929 A1 | 10/2022 | Sharma et al. | |
| 2023/0065096 A1* | 3/2023 | Nakahara | H04L 63/0815 |

* cited by examiner

ONBOARDING OF CUSTOMERS FROM SINGLE TENANT TO MULTI-TENANT CLOUD-NATIVE INTEGRATION SERVER

FIELD

The present disclosure relates to cloud infrastructure management. More particularly, the disclosure relates to techniques of onboarding users from a single tenant cloud environment to a multi-tenant cloud environment with minimal downtime.

BACKGROUND

The rapid development of technology and the ever-increasing demand for efficient and cost-effective solutions have driven the growth of cloud computing and cloud services. These innovative technologies have transformed the way users access, store, and manage data, providing a range of benefits and advantages over traditional on-premise solutions.

Cloud services are designed to provide individual and business users with remote access to computing resources, allowing them to perform computing tasks without the need to maintain local servers. This eliminates the need for businesses to invest in costly hardware and infrastructure, while also reducing the burden of IT maintenance and support. With cloud solutions, users have the ability to quickly and easily scale their computing resources up or down as needed, which enables users to adapt to new opportunities, environments, and challenges without the need for costly hardware upgrades or infrastructure changes.

Over the years, cloud computing and cloud services have undergone significant development to offer a diverse range of services including computing, networking, collaborating, communicating, data storage and backup, and database management. The cloud solutions have provided an all-encompassing suite of tools and technologies. Specifically, the range of cloud services has also expanded to encompass a variety of offerings, including Infrastructure as a Service (IaaS), Platforms as a Service (PaaS), Software as a Service (SaaS), Integration Platform as a Service (iPaaS), Containers as a Service (CaaS), Machine Learning as a Service (MLaaS), Functions as a Service (FaaS), and Internet of Things as a Service (IoTaaS).

To maintain cloud computing and cloud services to provide enhanced performance, scalability, and reliability, a timely upgrading to the cloud services is unavoidable. Although upgrading enables users to take advantage of the latest technologies and capabilities, the users may be negatively affected by the upgrading including temporary disruptions and downtime. During the upgrade process, cloud services or applications may be unavailable, which can cause delays or interruptions in work processes. Therefore, upgrading cloud services requires careful planning and testing to minimize disruptions and ensure that users are informed of any scheduled downtime in advance.

BRIEF SUMMARY

A cloud integration product such as Oracle Integration Cloud (OIC) connects a user's on-site applications and systems with third-party enterprise software and other cloud-based programs. More specifically, the cloud integration product integrates a user's cloud and on-premises applications, automates business processes, gains insight into their business processes, and facilities development of visual applications. Techniques are provided (e.g., a method, a system, non-transitory computer-readable medium storing code or instructions executable by one or more processors) herein for onboarding users from a version of a cloud integration product that is implemented in a single tenant cloud environment to a subsequent version of the cloud integration product that is implemented in a multi-tenant cloud environment with minimal downtime.

In various embodiments, a computer-implemented method is provided that includes: accessing, by a computing system, an eligibility status check for a first cloud service instance running a first version of a cloud service provided by a first cloud service system in a first cloud environment, where the eligibility status check indicates that the first cloud service instance is eligible for an upgrade from the first version of the cloud service to a second version of the cloud service provided by a second cloud service system; in response to the eligibility status check indicating that the first cloud service instance is eligible for the upgrade, exporting, by the computing system, a first copy of data from the first cloud service instance to a common storage device, where the common storage device is accessible by the first cloud service system and the second cloud service system; provisioning, by the computing system, a second cloud service instance running on the second version of the cloud service provided by the second cloud service system in a second cloud environment, where the first cloud environment is a different type of environment from that of the second cloud environment; importing, by the computing system, the first copy of the data from the common storage device to the second cloud service instance, where during the exporting, the provisioning, and the importing the first cloud service instance continues to run the first version of the cloud service; and activating, by the computing system, the second cloud service instance to run using the second version of the cloud service provided by the second cloud service system in the second cloud environment, where the activating comprises redirecting access of a user from the first cloud service instance to the second cloud service instance.

In some embodiments, the activating further comprises obtaining a second copy of data from the first cloud service instance, comparing the first copy of the data to the second copy of the data, determining one or more changes made to the first copy of the data based on the comparing, and applying the one or more changes to the first copy of the data in the second cloud service instance.

In some embodiments, the redirecting comprises changing an address for the cloud service in a Domain Name System from a first address pointing to the first cloud service instance to a second address pointing to the second cloud service instance.

In some embodiments, the computer-implemented method further comprises determining, by the computing system, eligibility of the first cloud service instance for the upgrade from the first version of the cloud service to the second version of the cloud service, where the determining comprises applying rules to determine whether various aspects of the first cloud service instance pass or fail an eligibility test and determining the eligibility status check for the first cloud service instance based on the applying the rules, and where each of the various aspects can be toggled on or off to control whether each aspect will be used for the determining the eligibility of the first cloud service instance for the upgrade.

In some embodiments, the computer-implemented method further comprises in response to the eligibility status check indicating that the first cloud service instance is eligible for the upgrade, provisioning, by the computing system, a service agent in an on-premise environment of the user, where the service agent is connected to both the first cloud service system and the second cloud service system for facilitating the exporting, the provisioning, the importing, and the activating.

In some embodiments, the exporting, the provisioning, the importing, and the activating are implemented by a scheduler that monitors tasks and directed acyclic graphs (DAGs) associated with each of the exporting, the provisioning, the importing, and the activating, and triggers, based on the monitoring, task instances once dependencies of the task instances are complete.

In some embodiments, the first cloud environment is a single tenant environment and the second cloud environment is a multi-tenant environment, and where in response to a request from the user, executing, by the computing system, an action to (i) delete the first cloud service instance, or (ii) redirect an access of the user from the second cloud service instance back to the first cloud service instance.

In various embodiments, a system is provided that includes one or more data processors and one or more non-transitory computer readable media storing instructions which, when executed on the one or more data processors, cause the one or more data processors to perform part or all of one or more methods disclosed herein.

In various embodiments, a computer-program product is provided that is tangibly embodied in one or more non-transitory machine-readable media and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

The present invention will be better understood in view of the following non-limiting figures, in which.

Figure 1:
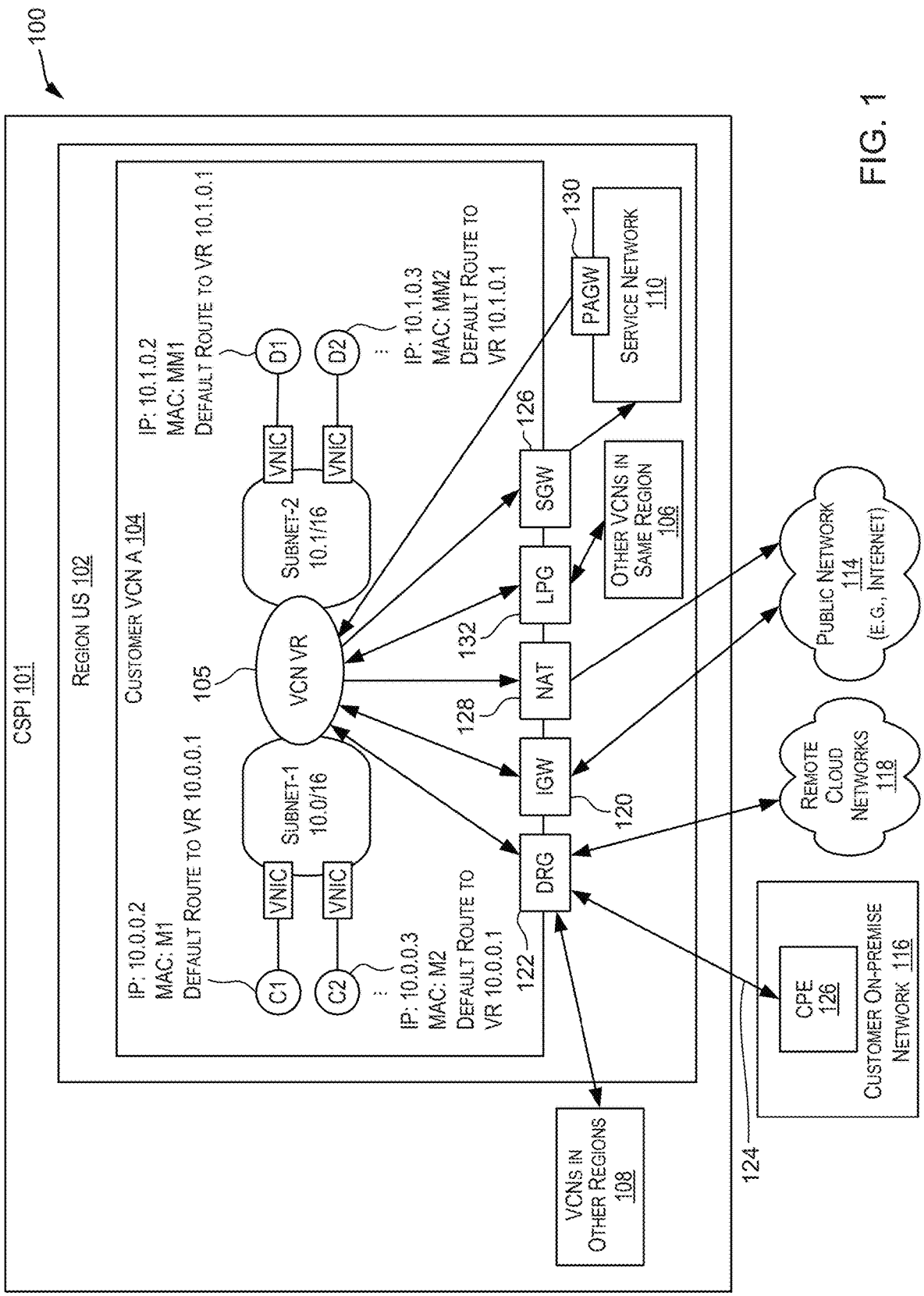
FIG. 1 is a high-level diagram of a distributed environment showing an overlay or user virtual cloud network hosted by cloud service provider infrastructure according to various embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

Cloud computing is on-demand access, via a network such as the Internet, to computing resources—applications, servers (physical servers and virtual servers), data storage, development tools, networking capabilities, and more—hosted at a remote data center managed by a cloud services provider. A cloud infrastructure such as Oracle Cloud Infrastructure (OCI) is a set of cloud computing services (cloud services) that enable a user to build and run a range of applications and services in a hosted environment. The cloud infrastructure is physically hosted in one or more global regions (i.e., data centers managed by a cloud services provider such as Oracle) and provides high-performance compute capabilities (as physical or virtual hardware instances) and storage capacity in a flexible overlay virtual network that is securely accessible from a user's on-premises network. Cloud services provided by the cloud infrastructure natively integrate with resources maintained in the hosted environment, like databases and compute instances (e.g., physical and/or virtual servers).

A cloud infrastructure can offer high-performance compute, storage, and network capabilities or services in a flexible overlay virtual network that runs on top of the physical underlay network and that is securely accessible from a user's on-premises network. The cloud infrastructure allows users to manage their cloud-based workloads in the same way they manage their on-premises workloads. Thus, users can get all the benefits of the cloud with the same control, isolation, security, and predictable performance as their on-premises network. A user can build their own networks using compute, memory, and networking resources provided by the cloud. For example, a customer can use resources provided by the cloud to build one or multiple customizable and private network(s) referred to as virtual cloud networks (VCNs). A user can deploy one or more user resources, such as compute instances, on these user VCNs. Compute instances can take the form of virtual machines, bare metal instances, and the like. The cloud thus provides infrastructure and a set of complementary cloud services that enable users to build and run a wide range of applications and services in a highly available hosted environment.

Just as local servers that are regularly upgraded to ensure a better performance, cloud infrastructure and cloud services such as an Integration Cloud Service need to be upgraded as well. Upgrading cloud infrastructure and cloud services involves the process of improving or updating the computing resources, applications, and services of a cloud environment to enhance its performance, scalability, and reliability. An upgrade of the cloud infrastructure and cloud services is necessary to accommodate increasing workloads, adopting new features or functionality, improving security, and/or addressing issues with outdated software or hardware.

An upgrade of cloud infrastructure and cloud services may involve hardware and/or software. An upgrade of hardware in a cloud environment may involve adding new servers, storage devices, or networking equipment to the cloud infrastructure to increase capacity and performance. An upgrade of software in a cloud environment may involve updating operating systems, applications, virtual machines, or databases to the latest versions or patching known vulnerabilities. Sometimes, an upgrade of cloud infrastructure and cloud services involves upgrading how the hardware and/or software are accessed by customers (e.g., conversion from a single tenant cloud server to a multi-tenant cloud server) so that computing resources can be dynamically allocated based on simultaneous user needs.

However, it is inevitable that an upgrade involves a disruption of the normal functioning of the cloud infrastructure and cloud services. During the upgrading period, data that are stored in the cloud environment needs to be backed up, operating systems, applications, and/or databases need to be upgraded, and users' normal access to the cloud infrastructure and cloud services is interrupted. A normal upgrade may take several hours to several days (the "downtime"), which substantially affects the users' access to the cloud infrastructure and cloud services, and negatively affects the user experience. An upgrade is not always successful for a variety of reasons, for example, an upgrade may be interrupted by an unsupported feature and has to roll back to the previous version. Additionally, an upgrade may involve a required change to an on-premise agent, which further requires an action from the user. Furthermore, an upgrade may involve multiple parties and sophisticated workflows, which demands a simultaneous monitoring of the complete process.

In order to address these challenges and others, the present disclosure is directed to techniques of onboarding users from a version of a cloud integration product that supports single tenant cloud environment to a subsequent version of the cloud integration product that supports multi-tenant cloud environment with minimal downtime. The present disclosure also provides an adjustable, pre-upgraded eligibility check, which substantially improves the success rate of upgrading. Additionally, the techniques provide solutions to seamless, automatic upgrading of on-premises agents. The present disclosure also describes the use of directed acyclic graphs (DAGs) to manage and oversee the whole upgrade process.

In various embodiments, the techniques disclosed herein comprise accessing, by a computing system, an eligibility status check for a first cloud service instance running using a first version of a cloud service provided by a first cloud service system in a first cloud environment, where the eligibility status check indicates that the first cloud service instance is eligible for an upgrade from the first version of the cloud service to a second version of the cloud service provided by a second cloud service system, and where the first cloud environment is a single tenant environment; in response to the eligibility status check indicating that the first cloud service instance is eligible for the upgrade, exporting, by the computing system, a first copy of data from the first cloud service instance to a common storage device, where the common storage device is accessible by the first cloud service system and the second cloud service system; provisioning, by the computing system, a second cloud service instance running on the second version of the cloud service provided by the second cloud service system in a second cloud environment, where the second cloud environment is a multi-tenant environment; importing, by the computing system, the first copy of the data from the common storage device to the second cloud service instance, where during the exporting, the provisioning, and the importing the first cloud service instance continues to run using the first version of the cloud service provided by the first cloud service system; and activating, by the computing system, the second cloud service instance to run using the second version of the cloud service provided by the second cloud service system in the second cloud environment, where the activating comprises redirecting access of a user from the first cloud service instance to the second cloud service instance.

A cloud service instance is a specific deployment of a cloud service (old generation or new generation) for a particular user. When a user subscribes to a cloud service, the cloud services provider (CSP) provisions an instance of the service for the user's use. In a single-tenant cloud environment, each instance is typically isolated and secured from other instances, with its own set of resources and configuration (e.g., servers, database, and application). In a multi-tenant cloud environment, multiple users may share the same servers, database, and application. Cloud service instances can be managed through a control panel or API. A cloud service system is a collection of cloud services that work together to provide computing resources and services to users through the internet. A cloud environment refers to a computing environment provided by CSPs over the internet. In a cloud environment, users can access cloud services and manage computing resources. The term "cloud environment" may be used interchangeably with "cloud." The cloud infrastructure refers to hardware components and software programs that underly a cloud environment. A cloud infrastructure may comprise servers, storage devices, networking equipment, software programs or tools, and the like. As used herein, the term "downtime" refers to a period of time during which a cloud environment or service, including a computing system, network, website, or application, is unavailable to a user. A CSP may have a downtime commitment with a user that specifies the amount of time a cloud environment or service will be unavailable or unavailable. In some instances, the downtime commitment specifies a maximum amount of downtime that is acceptable during a given period of time, such as hours or days.

Examples of Cloud Networks

The term cloud service is generally used to refer to a service that is made available by a CSP to users (e.g., cloud service customers) on demand (e.g., via a subscription model) using systems and infrastructure (cloud infrastructure) provided by the CSP. Typically, the servers and systems that make up the CSP's infrastructure are separate from the user's own on-premise servers and systems. Users can thus avail themselves of cloud services provided by the CSP without having to purchase separate hardware and software resources for the services. Cloud services are designed to provide a subscribing user easy, scalable access to applications and computing resources without the user having to invest in procuring the infrastructure that is used for providing the services.

There are several cloud service providers that offer various types of cloud services. As discussed herein, there are various types or models of cloud services including SaaS, PaaS, IaaS, and others. A user can subscribe to one or more cloud services provided by a CSP. The user can be any entity such as an individual, an organization, an enterprise, and the like. When a user subscribes to or registers for a service provided by a CSP, a tenancy or an account is created for that user. The user can then, via this account, access the subscribed-to one or more cloud resources associated with the account.

As noted above, IaaS is one particular type of cloud computing service. In an IaaS model, the CSP provides infrastructure (referred to as cloud services provider infrastructure or CSPI) that can be used by users to build their own customizable networks and deploy user resources. The user's resources and networks are thus hosted in a distributed environment by infrastructure provided by a CSP. This is different from traditional computing, where the user's resources and networks are hosted by infrastructure provided by the user.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The physical network (or substrate network or underlay network) comprises physical network devices such as physical switches, routers, computers and host machines, and the like. An overlay network is a logical (or virtual) network that runs on top of a physical substrate network. A given physical network can support one or multiple overlay networks. Overlay networks typically use encapsulation techniques to differentiate between traffic belonging to different overlay networks. A virtual or overlay network is also referred to as a virtual cloud network (VCN). The virtual networks are implemented using software virtualization technologies (e.g., hypervisors, virtualization functions implemented by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable users to build and run a wide range of applications and services in a highly available hosted distributed environment. CSPI offers high-performance compute resources and capabilities and storage capacity in a flexible virtual network that is securely accessible from various networked locations such as from a user's on-premises network. When a user subscribes to or registers for an IaaS service provided by a CSP, the tenancy created for that user is a secure and isolated partition within the CSPI where the user can create, organize, and administer their cloud resources.

Users can build their own virtual networks using compute, memory, and networking resources provided by CSPI. One or more user resources or workloads, such as compute instances, can be deployed on these virtual networks. For example, a user can use resources provided by CSPI to build one or multiple customizable and private virtual network(s) referred to as virtual cloud networks (VCNs). A user can deploy one or more user resources, such as compute instances, on a user VCN. Compute instances can take the form of virtual machines, bare metal instances, and the like. The CSPI thus provides infrastructure and a set of complementary cloud services that enable users to build and run a wide range of applications and services in a highly available virtual hosted environment. The user does not manage or control the underlying physical resources provided by CSPI but has control over operating systems, storage, and deployed applications; and possibly limited control of select networking components (e.g., firewalls).

The CSP may provide a console that enables users and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single user or tenant. In a multi-tenancy architecture, a software or a hardware component serves multiple users or tenants. Thus, in a multi-tenancy architecture, CSPI resources are shared between multiple users or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. User traffic is encapsulated to facilitate routing in the virtual network.

Accordingly, physical addresses (e.g., physical IP addresses) are associated with components in physical networks and overlay addresses (e.g., overlay IP addresses) are associated with entities in virtual or overlay networks. A physical IP address is an IP address associated with a physical device (e.g., a network device) in the substrate or physical network. For example, each NVD has an associated physical IP address. An overlay IP address is an overlay address associated with an entity in an overlay network, such as with a compute instance in a user's VCN. Two different users or tenants, each with their own private VCNs can potentially use the same overlay IP address in their VCNs without any knowledge of each other. Both the physical IP addresses and overlay IP addresses are types of real IP addresses. These are separate from virtual IP addresses. A virtual IP address is typically a single IP address that is represents or maps to multiple real IP addresses. A virtual IP address provides a 1-to-many mapping between the virtual IP address and multiple real IP addresses. For example, a load balancer may use a VIP to map to or represent multiple servers, each server having its own real IP address.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in a virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a VCN, or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, users' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A user's tenancy or account with the CSP exists in a single realm and can be spread across one or more regions that belong to that realm. Typically, when a user subscribes to an IaaS service, a tenancy or account is created for that user in the user-specified region (referred to as the "home" region) within a realm. A user can extend the user's tenancy across one or more other regions within the realm. A user cannot access regions that are not in the realm where the user's tenancy exists.

An IaaS provider can provide multiple realms, each realm catered to a particular set of users or users. For example, a commercial realm may be provided for commercial users. As another example, a realm may be provided for a specific country for users within that country. As yet another example, a government realm may be provided for a government, and the like. For example, the government realm may be catered for a specific government and may have a heightened level of security than a commercial realm. For example, OCI currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a user subscribes to an IaaS service, resources from CSPI are provisioned for the user and associated with the user's tenancy. The user can use these provisioned resources to build private networks and deploy resources on these networks. The user networks that are hosted in the cloud by the CSPI are referred to as VCNs. A user can set up one or more virtual cloud networks (VCNs) using CSPI resources allocated for the user. A VCN is a virtual or software defined private network. The user resources that are deployed in the user's VCN can include compute instances (e.g., virtual machines, bare-metal instances) and other resources. These compute instances may represent various user workloads such as applications, load balancers, databases, and the like. A compute instance deployed on a VCN can communicate with public accessible endpoints ("public endpoints") over a public network such as the Internet, with other instances in the same VCN or other VCNs (e.g., the user's other VCNs, or VCNs not belonging to the user), with the user's on-premise data centers or networks, and with service endpoints, and other types of endpoints.

The CSP may provide various services using the CSPI. In some instances, users of CSPI may themselves act like service providers and provide services using CSPI resources. A service provider may expose a service endpoint, which is characterized by identification information (e.g., an IP Address, a DNS name and port). A user's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Users of the service can then use this service endpoint to access the service. In certain implementations, a service endpoint provided for a service can be accessed by multiple users that intend to consume that service. In other implementations, a dedicated service endpoint may be provided for a user such that only that user can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and Dynamic Host Configuration Protocol (DHCP) options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A user can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The user can choose whether a given rule is stateful or stateless. For instance, the user can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control plane (CP) and the launching of compute instances is handled by a Compute Control plane. The Compute Control plane is responsible for allocating the physical resources for the compute instance and then calls the VCN Control plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane.

A user may create one or more VCNs using resources hosted by CSPI. A compute instance deployed on a user VCN may communicate with different endpoints. These endpoints can include endpoints that are hosted by CSPI and endpoints outside CSPI.

Various different architectures for implementing cloud-based service using CSPI are depicted in FIGS. 1-4C, and are described below. FIG. 1 is a high level diagram of a distributed environment 100 showing an overlay or user VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that users can subscribe to and use to build their VCNs. In certain embodiments, CSPI 101 offers IaaS services to subscribing users. The data centers within CSPI 101 may be organized into one or more regions. One example region "Region US" 102 is shown in FIG. 1. A user has configured a user VCN c/o Oracle International Corporation for region 102. The user may deploy various compute instances on VCN 104, where the compute instances may include virtual machines or bare metal instances. Examples of instances include applications, database, load balancers, and the like.

In the embodiment depicted in FIG. 1, user VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with C1. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has an private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has an private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 101 and endpoints outside CSPI 101. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the user's on-premise network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the user's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. As shown in the embodiment depicted in FIG. 1, a Dynamic Routing Gateway (DRG) 122 may be added to or be associated with user VCN 104 and provides a path for private network traffic communication between user VCN 104 and another endpoint, where the another endpoint can be the user's on-premise network 116, a VCN 108 in a different region of CSPI 101, or other remote cloud networks 118 not hosted by CSPI 101. User on-premise network 116 may be a user network or a user data center built using the user's resources. Access to user on-premise network 116 is generally very restricted. For a user that has both a user on-premise network 116 and one or more VCNs 104 deployed or hosted in the cloud by CSPI 101, the user may want their on-premise network 116 and their cloud-based VCN 104 to be able to communicate with each other. This enables a user to build an extended hybrid environment encompassing the user's VCN 104 hosted by CSPI 101 and their on-premises network 116. DRG 122 enables this communication. To enable such communications, a communication channel 124 is set up where one endpoint of the channel is in user on-premise network 116 and the other endpoint is in CSPI 101 and connected to user VCN 104. Communication channel 124 can be over public communication networks such as the Internet or private communication networks. Various different communication protocols may be used such as IPsec VPN technology over a public communication network such as the Internet, Oracle's FastConnect technology that uses a private network instead of a public network, and others. The device or equipment in user on-premise network 116 that forms one endpoint for communication channel 124 is referred to as the user premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a user to peer one VCN with another VCN in a different region. Using such an RPC, user VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for user VCN 104 the enables a compute instance on VCN 104 to communicate with public endpoints 114 accessible over a public network such as the Internet. IGW 120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for user's VCN 104 and enables cloud resources in the user's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for user VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by users. For example, a compute instance (e.g., a database system) in a private subnet of user VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The user uses the service CIDR label when they configure the SGW and related route rules to control traffic to the service. The user can optionally utilize it when configuring security rules without needing to adjust them if the service's public IP addresses change in the future.

A Local Peering Gateway (LPG) 132 is a gateway that can be added to user VCN 104 and enables VCN 104 to peer with another VCN in the same region. Peering means that the VCNs communicate using private IP addresses, without the traffic traversing a public network such as the Internet or without routing the traffic through the user's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a user VCN via a public network such as the Internet and or may be privately accessible via SGW 126. According to a specific private access model, services are made accessible as private IP endpoints in a private subnet in the user's VCN. This is referred to as a Private Endpoint (PE) access and enables a service provider to expose their service as an instance in the user's private network. A Private Endpoint resource represents a service within the user's VCN. Each PE manifests as a VNIC (referred to as a PE-VNIC, with one or more private IPs) in a subnet chosen by the user in the user's VCN. A PE thus provides a way to present a service within a private user VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the user tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the user VCN can access the service by sending traffic to the private IP address of the PE in the user VCN. A Private Access Gateway (PAGW) 130 is a gateway resource that can be attached to a service provider VCN (e.g., a VCN in service network 110) that acts as an ingress/egress point for all traffic from/to user subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more users. From the user's perspective, the PE VNIC, which, instead of being attached to a user's instance, appears attached to the service with which the user wishes to interact. The traffic destined to the private endpoint is routed via PAGW 130 to the service. These are referred to as user-to-service private connections (C2S connections).

The PE concept can also be used to extend the private access for the service to user's on-premises networks and data centers, by allowing the traffic to flow through FastConnect/IPsec links and the private endpoint in the user VCN. Private access for the service can also be extended to the user's peered VCNs, by allowing the traffic to flow between LPG 132 and the PE in the user's VCN.

A user can control routing in a VCN at the subnet level, so the user can specify which subnets in the user's VCN, such as VCN 104, use each gateway. A VCN's route tables are used to decide if traffic is allowed out of a VCN through a particular gateway. For example, in a particular instance, a route table for a public subnet within user VCN 104 may send non-local traffic through IGW 120. The route table for a private subnet within the same user VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a user VCN (i.e., by a resource or compute instance deployed on VCN 104) can be categorized as public access, private access, or dedicated access. Public access refers to an access model where a public IP address or a NAT is used to access a public endpoint. Private access enables user workloads in VCN 104 with private IP addresses (e.g., resources in a private subnet) to access services without traversing a public network such as the Internet. In certain embodiments, CSPI 101 enables user VCN workloads with private IP addresses to access the (public service endpoints of) services using a service gateway. A service gateway thus offers a private access model by establishing a virtual link between the user's VCN and the service's public endpoint residing outside the user's private network.

Additionally, CSPI may offer dedicated public access using technologies such as FastConnect public peering where user on-premises instances can access one or more services in a user VCN using a FastConnect connection and without traversing a public network such as the Internet.

CSPI also may also offer dedicated private access using FastConnect private peering where user on-premises instances with private IP addresses can access the user's VCN workloads using a FastConnect connection. FastConnect is a network connectivity alternative to using the public Internet to connect a user's on-premise network to CSPI and its services. FastConnect provides an easy, elastic, and economical way to create a dedicated and private connection with higher bandwidth options and a more reliable and consistent networking experience when compared to Internet-based connections.

Figure 2:
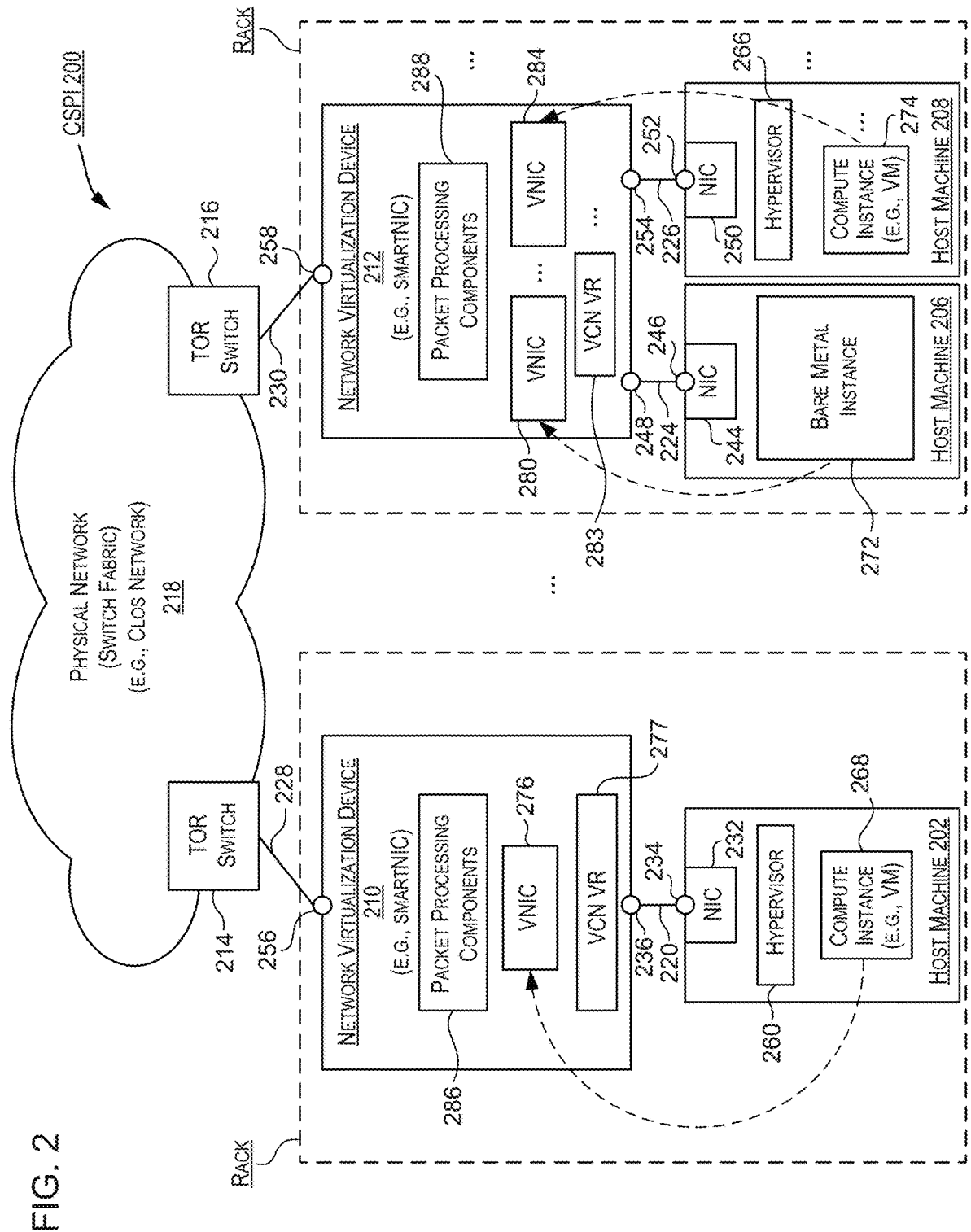
FIG. 2 is a simplified architectural diagram of the physical components in the physical network within a cloud service provider infrastructure that provide the underlay for a virtual network according to various embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a CSP. These components and resources are used to provide cloud services (e.g., IaaS services) to subscribing users, i.e., users that have subscribed to one or more services provided by the CSP. Based upon the services subscribed to by a user, a subset of resources (e.g., compute, memory, and networking resources) of CSPI 200 are provisioned for the user. Users can then build their own cloud-based (i.e., CSPI-hosted) customizable and private virtual networks using physical compute, memory, and networking resources provided by CSPI 200. As previously indicated, these user networks are referred to as VCNs. A user can deploy one or more user resources, such as compute instances, on these user VCNs. Compute instances can be in the form of virtual machines, bare metal instances, and the like. CSPI 200 provides infrastructure and a set of complementary cloud services that enable users to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instance 268 on host machine 202 and compute instance 274 on host machine 208 are examples of virtual machine instances. Host machine 206 is an example of a bare metal instance 272 that is provided to a user.

In certain instances, an entire host machine may be provisioned to a single user, and all of the one or more compute instances (either virtual machines or bare metal instance) hosted by that host machine belong to that same user. In other instances, a host machine may be shared between multiple users (i.e., multi-tenants). In such a multi-tenancy scenario, a host machine may host virtual machine compute instances belonging to different users. These compute instances may be members of different VCNs of different users. In certain embodiments, a bare metal compute instance is hosted by a bare metal server without a hypervisor. When a bare metal compute instance is provisioned, a single user or tenant maintains control of the physical CPU, memory, and network interfaces of the host machine hosting the bare metal instance and the host machine is not shared with other users or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
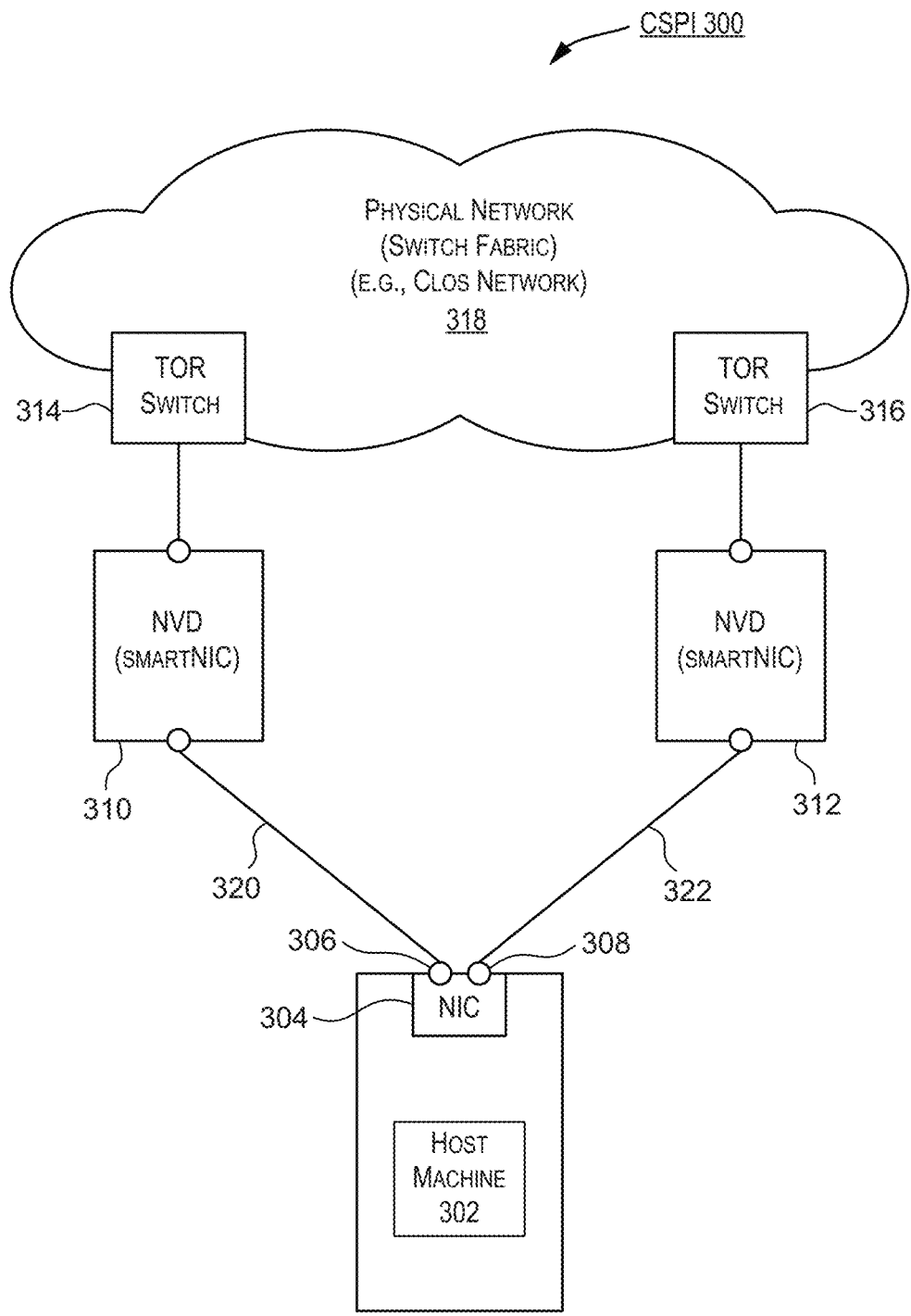
FIG. 3 shows an example within a cloud service provider infrastructure where a host machine is connected to multiple network virtualization devices according to various embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320, and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM)

instances, are offered to users, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with compute instances in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. The control plane functions include functions used for configuring a network (e.g., setting up routes and route tables, configuring VNICs, etc.) that controls how data is to be forwarded. In certain embodiments, a VCN Control plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the user's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206, and executes VNIC 284 that is associated with compute instance 274 hosted by host machine 208. A host machine may host compute instances belonging to different VCNs, which belong to different users, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a user VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination endpoint of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the user's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the user's VCNs, or VCNs not belonging to the user. Communications between endpoints hosted by CSPI 200 may be performed over physical network 218. A compute instance may also communicate with endpoints that are not hosted by CSPI 200, or are outside CSPI 200. Examples of these endpoints include endpoints within a user's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Framework for Onboarding Users from an Older Version of a Cloud Service to a Newer Version of the Cloud Service A CSPI (e.g., CSPI 101 and 200 described with respect to FIGS. 1 and 2) can be configured to provide one or more cloud services such as a cloud integration service. The cloud integration service is a fully managed, preconfigured environment that gives users the power to integrate their cloud and on-premises applications, automate business processes, develop visual applications, use a Secure File Transfer Protocol (SFTP)-compliant file server to store and retrieve files, and exchange business documents with a business-to-business trading partner. The objective of the present disclosure is to provide a system and methods to upgrade users from an older version of the cloud service to a subsequent or newer version of the cloud service. There are three primary challenges in many cloud service upgrade processes. (1) they typically take a lengthy period of time (e.g., 8-10 hours) to upgrade a user, but users typically want their down time limited to less than a predetermined amount of time such as 15 minutes. (2) The older version of the cloud service supports a different set of features than is supported by the subsequent or newer version of the cloud service. It is important that the upgrade does not interfere with user's business. (3) The upgrade process needs to scale for thousands of instances of the older version of the cloud service.

Figure 4A:
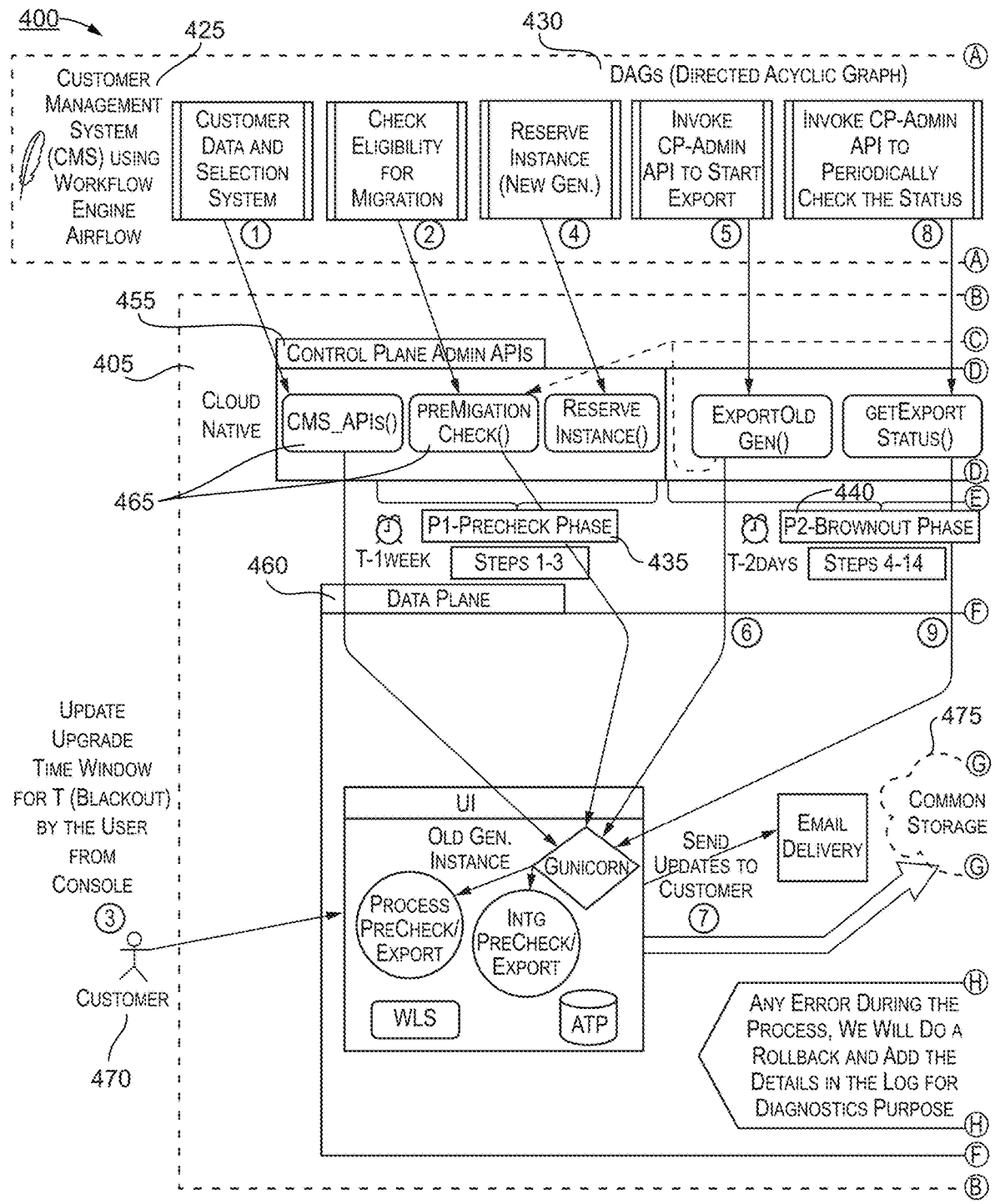
FIGS. 4A and 4B are a block diagram illustrating a framework that manages and oversee an upgrading process in accordance with various embodiments.
Figure 4B:
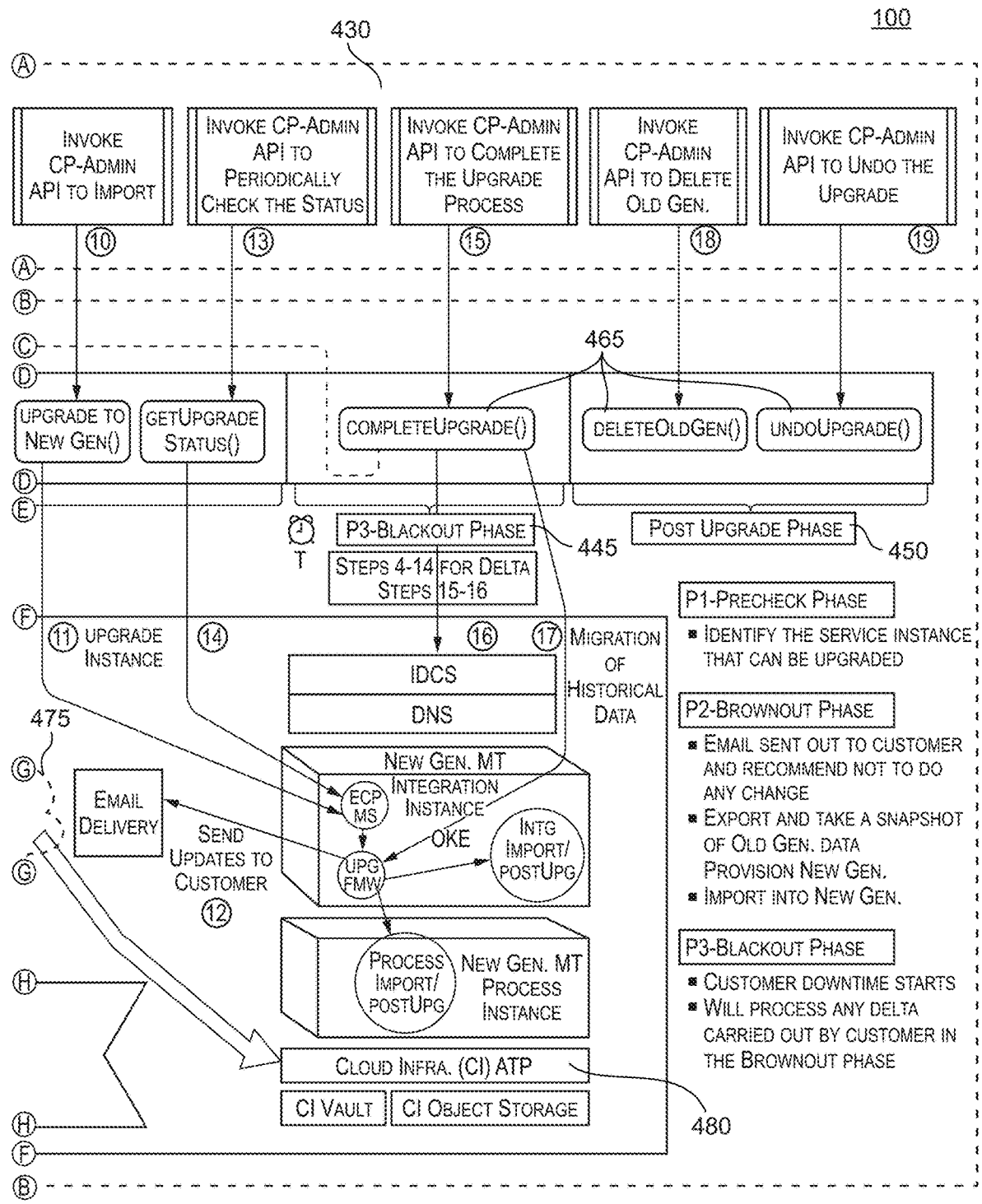
Figure 4C:
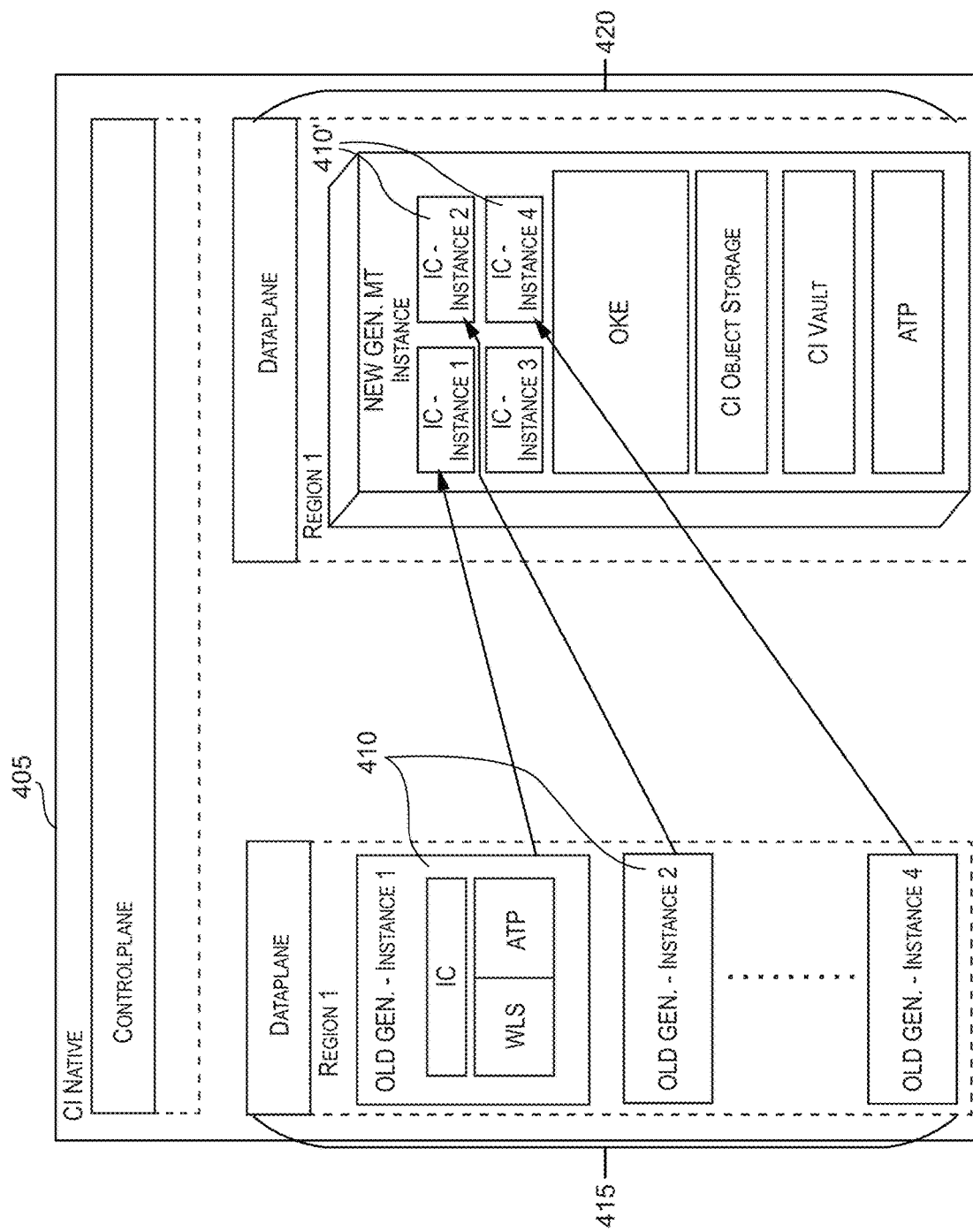
FIG. 4C is a high-level diagram of a distributed environment showing onboarding users from a version of a cloud integration product that is implemented in a single tenant cloud environment to a subsequent version of the cloud integration product that is implemented in a multi-tenant cloud environment in accordance with various embodiments.

To address these challenges and others, as shown in FIGS. 4A and 4B, a migration framework 400 has been developed that manages and oversees an upgrading process of a cloud service in accordance with various embodiments. The upgrading process is run on a cloud infrastructure 405 (e.g., CSPI 101 and 200 described with respect to FIGS. 1 and 2) and is achieved by configuring, executing, and/or forwarding programs and instructions in a control plane to invoke actions and/or data migration in one or more data planes. The upgrading process is overseen and automatically or semi-automatically controlled using a DAG based workflow system. The upgrading process involves an update of software of the cloud infrastructure, hardware of the cloud infrastructure, an update of configurations of the cloud infrastructure, or any combination thereof. As shown in FIG. 4C, in some instances, the upgrading process involves onboarding users from a version of a cloud service 410 (e.g., integration product) that is implemented in a single tenant cloud environment 415 to a subsequent version of the cloud service 410' (e.g., integration product) that is implemented in a multi-tenant cloud environment 420. The upgrade framework code executes and there is no change in the network configuration, VCN, port mapping, etc. of the cloud infrastructure 405.

Although in some instances the migration framework 400 and upgrading process is described herein with particular reference to upgrading a cloud service that is implemented in a single tenant cloud environment to a subsequent version of the cloud service that is implemented in a multi-tenant cloud environment, it should be understood that the migration framework 400 and upgrading process may also provide advantages in the instance of upgrading a cloud service in a single tenant cloud environment to another single tenant cloud environment to save time on downtime. However, the challenge in a single tenant cloud environment to multi-tenant cloud environment is the complete change in the infrastructure stack and the system will be unable to reuse the runtime artifacts that are in the single tenant cloud environment, and thus all of the runtime artifacts will need to be regenerated for the multi-tenant cloud environment in the brownout and blackout phase of the upgrading process.

The migration framework 400 comprises a customer management system (CMS) 425 configured to create, edit, organize, and execute various tasks of the upgrading process in the four phases P1-P4 using a DAG based workflow engine such as Apache's Airflow. A DAG is a collection of tasks that have directional dependencies. The DAG 430 can be defined in a Python script, which represents the DAGs structure (tasks and their dependencies) as code. Each node in the DAG 430 is a task (e.g., check eligibility for migration), and edges define dependencies amongst tasks. The graph is enforced to be acyclic so that there are no circular dependencies that can cause infinite execution loops. The tasks are the element to be run (e.g., to execute a process or phase) and actually perform the work of the workflow. Tasks can be two types: an operator that execute an explicit operation, or a sensor that can pause the execution of dependent tasks until some criterion has been met. In principle, operators can perform any function that can be executed in Python. Similarly, sensors can check the state of any process or data structure. The CMS 425 can execute the tasks based on parameters of the DAG 430. When the CMS 425 is running, it will define a regularly-spaced schedule of dates for which to execute a DAG's associated tasks. The execution times begin at the DAG's start date and repeat every schedule interval. For each execution time, a DagRun is created and operates under the context of that execution time. Thus, a DagRun is simply a DAG with some execution time. Advantageously, the upgrading process using CMS 425 is capable of being scaled to process the upgrades for about 4,000 users simultaneously with about 12,000 instances and minimal downtime.

As stated above, the CMS 425 is configured to create, edit, organize, and execute various tasks in the four phases P1-P4. The first phase (P1; 435) is a pre-check phase, the second phase (P2; 440) is a brownout phase, the third phase (P3; 445) is blackout phase (down time, which needs to be minimized), and the fourth phase (P4; 450) is post-upgrade phase. The CMS executes various tasks throughout the four phases in order to upgrade a cloud service for the user and achieve a minimal downtime compared to conventional upgrading processes. The only service interruption is in the third phase (P3; 445), which is limited to the predetermined window of time such as 15 to 30 minutes. The upgrading process is managed using a control plane 455, a data plane 460, and associated application programming interface (API) 465 provided by the cloud infrastructure.

1. Precheck Phase

As shown in FIG. 4A, the upgrading process starts from the precheck phase 435 which is a mechanism (subsystem or service) to assess the eligibility of an older version of the cloud service ("old generation") for upgrading to a subsequent or newer version of the cloud service ("new generation"). The precheck phase 435 identifies old generation instances that are eligible for an upgrade by applying rules to check whether a subset or all features or prerequisites (e.g., Agent Java Version, Connectivity agent running, Connectivity agent and JKS keystore updated, etc.) for the upgrade are present or have been completed. The conventional approach is that an old generation instance will be tried for upgrading, and if a certain feature is not yet supported, then the upgrade will fail and a rollback is initiated, which is a laborious task, and thereafter the upgrade will be tried again at later point in time. The precheck phase 435 not only avoids the unnecessary cycle of upgrade-fail-upgrade but also provides a mechanism to obtain knowledge or insight ahead of time into whether the upgrade will be successful. Another extension of precheck phase 435 is the pluggable nature of each check item (rule for features or prerequisites). More specifically, precheck phase 435 provides a mechanism for dynamically checking eligibility of the desired features or prerequisites. Each eligibility check item (rule for features or prerequisites) can be toggled on and off, which allows flexibility of enabling or disabling items of certain features or prerequisites that are supported or unsupported in the new generation.

In the precheck phase 435, an API 465 (CMS_APIs( )) can be used by the control plane 455 while performing the task: customer data and selection system (step ① in FIG. 4A) in order to select a user and retrieve the user's data and selection criteria for the update (e.g., instance and/or version of cloud service to be used). In various instances, the user's data and selection criteria comprises data for the old generation instance(s) in a single tenant cloud environment and the data and selection criteria for the new generation instance(s) in a multi-tenant cloud environment. The API 465 (CMS_APIs( )) is capable of being used to communicate with a server (e.g., Gunicorn, WebLogic Server (WLS)) of the data plane 460 to retrieve the user's data and selection criteria. In some instances, the server is a Web Server Gateway Interface (WSGI) server implementation that is used to run applications such as Python based web applications. In some instances, the control plane 455 uses the API 465 (CMS_APIs( )) to communicate with the server through a separate API and/or a user interface (UI) of the server or cloud infrastructure in the data plane 460. The API 465 (CMS_APIs( )) is also capable of being used by the control plane 455 to communicate with, manage, and coordinate various components of the cloud infrastructure 405.

A pre-migration check is also performed in the precheck phase 435 (step ② in FIG. 4A). After a user is selected and the user's data and selection criteria for the update are retrieved, an eligibility status check for the update is initiated, and the eligibility status is determined via the API 465 (PreMigration Check( )) using the user's data and selection criteria for the update. Determining the eligibility status comprises identifying old generation instances that are eligible for an upgrade by applying rules to the user's data and selection criteria and checking whether a subset or all features or prerequisites (e.g., Agent Java Version, Connectivity agent running, Connectivity agent and JKS keystore updated, etc.) for the upgrade are present or have been completed. In some instances, the eligibility status check may comprise applying multiple rules, and a failure of one rule returns a "fail" status of the eligibility status check. In other instances, the eligibility status check may comprise applying multiple rules, and a failure of a subset of rules or a number of rules greater than a predetermined threshold returns a "fail" status of the eligibility status check. The rules, features, and prerequisites are preconfigured (prior to the pre-migration check), and a toggle may be associated with each of the rules in a set. In some instances, the rules, features, and prerequisites are preconfigured, defined, and/or toggled by the CSP. The API 465 (PreMigration Check( )) is capable of being used by the control plane 455 to perform the eligibility status check in both the control plane 455 and the data plane 460 and consolidating the eligibility status check results. The eligibility status check results may be stored in data storage device or structure such as a memory or database of the cloud service instance and/or the control plane 455 of the cloud infrastructure 405.

The API 465 (PreMigration Check( )) may also be used by the control plane 455 to control the toggles of the rules such that any combination of the rules can be used in the eligibility status check, based on demands and configurations of the upgraded cloud service. In some instances, the rules, features, and prerequisites may determine an active status of the cloud service instance, a relationship between the cloud service instance and an insight model, a connection of the cloud service instance to an outside server or application, a user identity of the cloud service instance, a database status of the cloud service instance, software program versions of the cloud service instance, or any combination thereof.

In some instances, a user (e.g., a customer) can participate in the precheck phase 435 through interactions using a user console 470 (step ③ in FIG. 4A). The user may manage access and assign roles to the cloud service instance, request the upgrade from the olde generation instance to the new generation instance, implement the feature and/or complete the prerequisites required for the upgrade, respond to request from the cloud service provider, and/or reach out to a cloud support team to resolve an underlying problem or issue the cloud service and/or upgrade process. For example, a user may respond to a displayed warning message (e.g., an email notification) from the user console 470 that shows a "fail" status of the eligibility status check. A user may also respond to a displayed pass message (e.g., an email notification) from the user console 470 that shows a "pass" status of the eligibility status check, and/or trigger an execution of a further precheck (e.g., toggle on one or more of the eligibility checks that were toggled-off). A user may also accept the pass/fail eligibility status or reject the upgrade process by interactions from the user console 470. In some instances, a user can schedule a window for the upgrade process, preferably under a "pass" status of the eligibility status check. Further notifications may be pushed to the user based on the scheduled window to remind the user about the upgrade. In some instances, a user may initiate a precheck through an interaction using the user console 470 by requesting the upgrade.

Once the eligibility status check is passed, a cloud service instance in the upgraded cloud environment (e.g., the multi-tenant cloud environment) can be reserved/provisioned for the cloud service instance in the pre-upgraded cloud environment (e.g., single tenant cloud environment) (step ④ in FIG. 4A). When the upgrading process involves onboarding users of cloud service instances in a single tenant cloud environment to a multi-tenant cloud environment, the provisioned cloud service instance is a cloud service instance in the multi-tenant cloud environment. The reserving/provisioning comprises determining whether there is availability in the multi-tenant environment for another tenant and their cloud service instance, when there is availability, reserving an internet protocol (IP) address for the cloud service instance in the upgraded cloud environment and generating a private key for the user to access the cloud service instance in the multi-tenant environment, and when there is no availability, a new multi-tenant environment is created in the cloud infrastructure and then the internet IP address is reserved for the cloud service instance in the new multi-tenant environment and a private key is generated for the user to access the cloud service instance in the new multi-tenant environment. In some instances, the reserving/provisioning of the cloud service instance in the upgraded cloud environment takes place in the brownout phase 440. In some instances, the reserving/provisioning is triggered by a user's action, for example, an interaction by a user from the user console 470 such as initiating the upgrade, completing one or more prerequisites for the upgrade, accepting the upgrade, or the like.

The precheck phase 435 may take a period of time from the start to finish, depending on a variety of factors including performance of the eligibility status check, completion of one or more prerequisites for the upgrade, and/or the involvement of user input. Typically, it takes about one week for a user to go through the precheck phase 435. During the precheck phase 435, a user's use of the old generation instance in the pre-upgraded cloud environment (e.g., single tenant cloud environment) is substantially the same as normal use of the cloud service prior to initiating the upgrade process. Thus, there is no interruption of the cloud service in the precheck phase 435.

2. Brownout Phase

Once the pre-check has passed the old generation instance for upgrade, data from the old generation instance is exported to a common storage 475 in the brownout phase 440 (step ⑤ in FIG. 4A). The data includes the user's run time data that is generated within the old generation instance (e.g., information on connectivity or integration between a user's applications in the pre-upgraded cloud environment, connectivity or integration to SaaS applications, information about the running integrations, performance of transactions in the integrations, business identifiers that track fields in messages and manage errors by integrations, and the like). The common storage 475 can be accessed by both the old generation instance and the new generation instance. This allows for the old generation instance to continue running while a majority of the upgrade process is executed without disrupting service. Additionally, in some instances, the new generation instance in the upgraded cloud environment (e.g., the multi-tenant cloud environment) is provisioned for the old generation instance in the pre-upgraded cloud environment (e.g., single tenant cloud environment).

The initiation of the exporting process may be invoked or controlled via the API 465 (exportGen2( )) of the control plane 455. In some instances, the API 465 (exportGen2( )) is used by the control plane 455 to communicate with the server of the data plane 460 (e.g., Gunicorn) to perform the exporting of data (step ⑥ in FIG. 4A). The data is generally exported from the old generation instance and stored in the common storage 475 (e.g., an object storage) of the cloud infrastructure 405 (step ⑦ in FIG. 4A). Object storage is a data storage architecture for storing unstructured data, which sections data into units (objects) and stores them in a structurally flat data environment. Each object includes the data, metadata, and a unique identifier that applications run with the cloud service can use for easy access and retrieval. The common storage 475 is accessible from both the pre-upgraded cloud environment and the new generation cloud environment. In some instances, a snapshot of the data used and/or stored in the old generation instance may be taken before or simultaneously with the exporting of data in order to determine delta data to be exported and imported during the blackout phase 445, as discussed in further detail herein.

Depending on the size of data used and/or stored in the old generation instance, the exporting of data may take from several hours to several days. The exporting of data should not disturb the normal use of the user associated with corresponding service instances, because the exporting of data makes a copy of data stored in the old generation instance and stores the copy in the common storage. An object store bucket in the common storage may be created for and assigned to each cloud service instance and one or more credential signatures (e.g., password credentials or generic credentials, or certificates) may be used to secure that data stored in different buckets is not accessible by unauthorized users. In some instances, the one or more credential signatures are treated as data stored in the old generation instances and exported to the assigned object store bucket.

During the exporting of data in the brownout phase 440, users may be communicated with regarding the upgrading process/exporting of data through a cloud application or an email delivery system. A notification email may be sent to the authorized user on a periodic basis (e.g., daily) regarding the upgrading process. A user may also request the notification through the user console 470 or a cloud application.

The status of the exporting of data may be periodically checked by the control plane 455 (step ⑧ in FIG. 4A). The API 465 (getExportStatus( )) may be used by the control plane 455 to invoke the periodic check of the status of the export. The control plane 455 communicates with a server of the data plane 460 (e.g., Gunicorn) via the API 465 (getExportStatus( )) to perform the periodic check of the status of the export (step ⑨ in FIG. 4A). The status check may return a result of "export-in-progress," "export-failed," "export-passed," "export-not-started," or the like. The result may further comprise a reason for an export failure. In some instances, the failure is caused by insufficient storage space in the common storage 475 or related to a security check. The exporting process may be manually or automatically checked and resumed after receiving a failure status.

After success of exporting of data stored and/or used in the old generation instance and uploading the data to the common storage 475 (e.g., object storage buckets), the step of importing data to a new generation instance in the upgraded cloud environment is invoked (step ⑩ in FIG. 4B). The initiation of the importing process may be invoked or controlled by the API 465 (upgradeToGen3( )) of the control plane 455. In some instances, the control plane 455 uses the API 465 (upgradeToGen3( )) to communicate with a server or virtual machine of the data plane 460 in the upgraded cloud environment to perform the importing of data from the common storage 475 to the new generation instance (step ⑪ in FIG. 4B). In some instances, the control plane 455 uses the API 465 (upgradeToGen3( )) to communicate with an exchange control panel of the server or virtual machine regarding the upgrading process and the importing of data.

The imported data is associated with or stored in the provisioned new generation instance that is reserved for the old generation instance in the precheck phase 435. This prepares the new generation instance and upgraded cloud environment to accommodate use of the cloud service and data by the user. Alternatively, in the instance the new generation instance was not provisioned/reserved in the precheck phase 435, the new generation instance in the upgraded cloud environment (e.g., the multi-tenant cloud environment) is provisioned for the old generation instance in the pre-upgraded cloud environment (e.g., single tenant cloud environment) and the imported data is associated with or stored in the provisioned new generation instance. As should be understood, in the instance in which the upgraded cloud environment is a multi-tenant cloud environment, the provisioning of the new generation cloud service instance does not require provisioning a new environment for every user because user's share the environment. Activation is also performed for each new generation instance associated with the user. A user can be associated with many new generation instances, each of which must be activated separately, so activation can be costly from a resource standpoint.

In some instances, the exporting and importing of data into and from the common storage may be managed and performed in conjunction with a database cloud service 480 (e.g., Autonomous Transaction Processing (ATP)) of the cloud infrastructure 405. The database cloud service 480 can perform database management, including provisioning, patching, scaling, and backups of data in the common storage 475, including performing all routine database maintenance tasks while the system is running, without human intervention. The database cloud service 480 leverages advanced features, such as automatic indexing, automatic memory management, and automatic query optimization, to optimize performance and reduce the need for manual tuning. The database cloud service 480 may further include built-in security features, such as encryption at rest and in transit, automatic backups, and data isolation.

During the importing of data in the brownout phase 440, users may be communicated with regarding the upgrading process/importing of data through a cloud application or an email delivery system. A notification email may be sent to the authorized user on a daily basis regarding the upgrading process (step ⑫ in FIG. 4B). A user may also request the notification through the user console 470 or a cloud application.

The status of the importing of data may also be periodically checked (step ⑬ in FIG. 4B). The API 465 (getUpgradeStatus( )) may be used by the control plane 455 to invoke the periodic check of importing status. The control plane 455 uses the API 465 (getUpgradeStatus( )) to communicate with the server of the data plane 460 in the upgraded cloud environment to perform the periodic check for the status of importing the data (step ⑭ in FIG. 4B). The status check may return a result of "import-in-progress," "import-failed," "import-passed," "import-not-started", or the like. The result may further comprise a reason for an import failure. In some instances, the failure is related to storage capacity of the new generation instance in the upgraded cloud environment or related to a security check. The importing process may be manually or automatically checked and resumed after receiving a failure status.

The brownout phase 440 may take a period of time from the start to finish, depending on a variety of factors including the data size in the old generation service instances and/or the involvement of user input. Typically, it takes about two days to go through the brownout phase 440. During the brownout phase 440, a user's use of the old generation instance in the pre-upgraded cloud environment (e.g., single tenant cloud environment) is substantially the same as normal use of the cloud service prior to initiating the upgrade process. Thus, there is no interruption of the cloud service in the brownout phase 440.

3. Blackout Phase

Once the brownout phase 440 ends, there is an identical (or substantially close to identical) cloud service instance in the pre-upgraded cloud environment and the upgraded cloud environment, except that the user does not have visibility to the new generation instance. In other words, the Domain Name System (DNS) is still pointing to the old generation instance. During the blackout phase 445, the old generation instance is stopped, which prevents requests to the old generation instance from being processed. Also, security features are configured during the blackout phase 445, for example, the identity cloud service (IDCS) system information is shared with the new generation instance. In some instances of the upgrade process, it is possible that the user has made changes to the data in the old generation instance during the brownout phase 440. Changes cannot be prevented during the brownout phase 440, or it would be considered downtime of the old generation instance. An algorithm (delta check) is disclosed herein that detects what has changed between the data in the common storage 470 (now uploaded into the new generation instance) and the current data in the old generation instance and applies those changes to the data in the new generation instance. After the new generation instance is configured and the changes are applied to the data in the new generation instance, the DNS is pointed to the new generation instance. This DNS switch allows user requests associated with the cloud service to now be routed to the new generation instance.

As shown in FIG. 4B, the blackout phase 445 completes the upgrade process by configuring the new generation instance and applying changes to the data in the new generation instance (step ⑮ in FIG. 4B). The API 465 (CompleteUpgrade( )) may be used by the control plane 455 to initiate and control completion of the upgrading process. In some instances, the control plane 455 uses the API 465 (CompleteUpgrade( )) to communicate with the server or virtual machine of the data plane 460 in the upgraded cloud environment to configure the new generation instance and perform a migration of delta data (step ⑰ in FIG. 4B). Configuring the new generation instance may comprise configuring or updating application and cloud service features, for example, the identifiers such as cloud infrastructure identifiers of various components (e.g., VMs) may be updated to correspond to the new generation instance and/or the upgraded cloud environment. The migration of the delta data is performed using a cloud application or product that is capable of upgrading or updating an existing configuration in a pre-upgraded cloud environment to a new version and installing a new configuration to the new generation cloud environment, which ensures the compatibility of data, software, and applications in the upgraded cloud environment.

Prior to the blackout phase 445, the DNS is still pointing to the old generation instance in the pre-upgraded cloud environment. The DNS converts domain names into IP addresses, which allow browsers (e.g., a browser of the user console) to get to websites, services, and other internet and cloud-based resources. Therefore, the IP address of the old generation instance is still being used by the DNS to route service or resource requests from the user to the cloud service. During the blackout phase 445, the pre-upgraded cloud environment is stopped, which essentially prevents requests from the user to the old generation instance from being processed. Once the pre-upgraded cloud environment is stopped, the IP address of the cloud service is updated in the DNS to point to the new generation instance in the upgraded cloud environment (step ⑯ in FIG. 4B). Additionally, security features may be configured during the blackout phase 445, for example, the Identity Cloud Service (IDCS) information may be shared with the upgraded cloud environment allowing for the user to securely access the new generation instance.

As discussed above, it is highly likely that a user may have made changes to the data stored in or used by the old generation instance during the brownout phase 440. Therefore, it is important for a successful upgrade to identify and update these changes. Conventional ways to keep track of the changes are to migrate all data stored in the service instance in the pre-upgraded cloud environment during the blackout phase, which results in substantially longer downtime (usually longer than 8 hours) that the cloud service is unavailable for the user. To shorten the downtime during the blackout phase 445, an algorithm (delta check) is implemented that can detect what has changed (delta data) between the data in the common storage (e.g., object storage bucket) and the data for the old generation instance and apply those changes to the new generation instance in the upgraded cloud environment.

The delta data refers to the changes or differences between the two sets of data at a given point in time. The delta data includes changes in (i) activation and deactivation, (ii) project update, (iii) new integrations, (iv) new packages, (v) connection update, (vi) lookups update, (vii) certificate updates, (viii) library updates, (ix) notification settings updates, (x) schedule params and integration properties updates, or any combination thereof. In some instances, the delta data represents the updates or modifications that have occurred to the data for the old generation instance since the data was exported to the common storage. In some instances, the delta data represents the updates or modifications that have occurred to the data for the old generation instance since the last synchronization or comparison. In some instances, the delta data is data generated by user(s) and/or the old generation instance at one or more periods of time overlapping with steps ④ to ⑭. During the blackout phase 445, instead of transmitting the entire data (or dataset) stored in the old generation instance to the new generation instance, only the delta data is transmitted, which not only reduces network bandwidth and improves synchronization efficiency, but also substantially shortens the downtime. It also requires less storage space compared to full data immigration during the blackout phase 445.

The capturing and tracking of the delta data is implemented by the delta check using a mirror table. The mirror table matches the old generation instance schema, and one or more scripts are written and executed on the mirror table to filter out only data records that are newly added and inserted into the mirror table (e.g., from the point of time at which the data is exported to the commons storage until the point of time where the pre-upgraded cloud environment is stopped). In some instances, the mirror table is exported as a part of the blackout phase 430 and then merged with an existing table in the new generation instance.

For delta/change detection, on the old generation side, first an empty mirror table X' is created for the table X, and X' will have the same schema as X. Next, the rows in X that are affected (e.g., changes to the data) after the brownout start time are identified and inserted into X'. On the new generation side, the X' is imported as it is and then the database's upsert command is used to perform an update operation in X if it is an existing record or perform an insert operation in X if it is a new record. More specifically, the delta/change detection includes: (i) creating a primary table comprising current data in the old generation instance (or a log, a log file, or the like), e.g., G #_UPGRADE_LOG; (ii) executing a procedural extension (e.g., Procedural Language/Structured Query Language (PL/SQL), a PL/SQL procedure, or the like) to create a first set of blackout mirror tables based on the data and schema of the primary table (including but not limited to, e.g., BLACKOUT_ICS_RESOURCE, BLACKOUT_ICS_ARIFACT, BLACKOUT_ICS_RESOURCE MAPPING, BLACKOUT_ICS_AUDIT_LOG, or BLACKOUT_ICS_SCHEDULE_PARAMS) and executing one or more scripts to filter out only data records that are newly added and inserted into the first set of blackout mirror tables (e.g., from the point of time at which the data is exported to the commons storage until the point of time where the pre-upgraded cloud environment is stopped); (iii) exporting the first set of blackout mirror tables to the common storage (e.g., the object storage); (iv) creating a second set of blackout mirror tables in the new generation instance (including but not limited to, e.g., BLACKOUT_ICS_RESOURCE, BLACKOUT_ICS_ARIFACT, BLACKOUT_ICS_RESOURCE MAPPING, BLACKOUT_ICS_AUDIT_LOG, or BLACKOUT_ICS_SCHEDULE_PARAMS) (the second set of blackout tables may be created during the importing of data to the new the new generation instance); (v) importing the first set of blackout mirror tables from the common storage into the second set of blackout mirror tables; (vi) inserting and updating (or upsert) the second set of blackout mirror tables to a primary table in the new the new generation instance; and (vii) performing activation/deactivation of the new the new generation instance based on data in the primary table in the new the new generation instance.

In some instances, executing the procedural extension comprises inserting one or more values for the data in primary table comprising data in the old generation instance to a table in the first set of blackout mirror tables. The table in the first set of blackout mirror tables is able to hold the last exported timestamp and to maintain the history of precheck and export of the data. The table also enables status checks and the ability to obtain reasons for failures in the new generation instance. The first set of blackout mirror tables is exported to the common storage at a designated or predetermined timestamp. In some instances, different blackout tables are exported to the common storage at different times as log recorded changes happening at different stages (e.g., during design time or run time). In some instances, a security archive or table related to secrets and certificates is exported to the common storage only if there is any change in connection or certificates. Since this export takes about 5 to 10 minutes, security data can be stored in a web-logic server (or WLS) as files and delta detection take more time.

The blackout phase 445 may take a period of time from the start to finish, depending on a variety of factors including the delta data size in the delta check and configuration of the new generation instance. Typically, it takes about a few minutes (e.g., 15-30 minutes) to go through the blackout phase 445. During the blackout phase 445, a user cannot use the old generation instance or the new generation instance. Thus, there is a brief interruption of the cloud service in the blackout phase 445.

4. Post Upgrade Phase

The post upgrade phase 450 is not a necessary phase in every upgrading process, but it is a preferable phase that is computational efficient and improves user experience and satisfaction. During the post upgrade phase 450, the old generation instance can be reserved and maintained for a predetermined period of time ("grace period") to facilitate possible rollbacks. A query may be sent to the user during the post upgrade phase 450 to ensure the user is satisfied with the upgrade and/or the upgrading process. After receiving positive feedback, the old generation instance and delta data may be deleted, and relevant changes are made to make the upgrading process integrated and computational efficient.

As shown in FIG. 4B, the post upgrade phase 450 may comprise deleting data stored in the old generation instance and/or the old generation instance itself in the pre-upgraded cloud environment (step ⑱ in FIG. 4B). The API (DeletGen2( )) may be used by the control plane 455 to initiate and control completion of the deleting process. In some instances, the API 465 (DeletGen2( )) is used by the control plane 455 to communicate with a server of the data plane 460 to perform the deletion of data stored in the old generation instance and/or the old generation instance itself. In some instances, the old generation service instances and related data are permanently deleted from any database or anywhere in the pre-upgraded cloud environment. In other instances, the old generation service instances and related data are deleted from any database or anywhere in the pre-upgraded cloud environment but a portion or all the old generation service instances and related data are archived in a storage device on-premises of the user and/or elsewhere in the cloud infrastructure.

The post upgrade phase 450 may further comprise a process to undo one or more phases (including all) of the upgrading process (step ⑲ in FIG. 4B). The API 465 (undoUpgrade( )) may be used by the control plane to initiate and control completion of the undo process. In some instances, the API 465 (undoUpgrade( )) is used by the control plane 455 to communicate with a server of the data plane 460 to perform the undo process. In some instances, data from the old generation instance and/or the new generation instance may be stored in the common storage for a predetermined period of time. In some instances, if an error occurred during the upgrading process, a rollback may be performed using the undo process and details regarding the error may be added to an upgrade log for diagnostic purposes. Prior to initiation of the undo process, users may be communicated with regarding the upgrade and/or undo process through a cloud application or an email delivery system. A user may also request the notification through the user console 470 or a cloud application.

In some instances, an on-premise agent is involved in the upgrading process. The on-premise agent is a software program or tool that is installed and runs on a local computer (or a private server within a private user's network or infrastructure) that creates a secured connection between the local computer and cloud services. The on-premise agent can collect, encrypt and transmit data securely to the cloud services, and then retrieve and process the results returned from the cloud services. To provide a seamless upgrading experience to a user, the on-premise agent may need to be upgraded as well along with the cloud service upgrading process and without any intervention from the user. The techniques disclosed herein enable the on-premise agent talking to cloud products preferably using credentials (including application identification (appid) and secret), and retaining the same credentials. The migration of credentials from old generation products to new-generation product may be automatically or semi-automatically handled by the upgrading process so the agent can continue to use the same. The on-premise agent might be capable of communicating only to the pre-upgraded cloud environment before the upgrading process. Using the techniques disclosed herein, the agent version may be first upgraded to make it communicable with both the old generation instance and the new generation instance, making the upgrading process smooth.

Figure 5A:
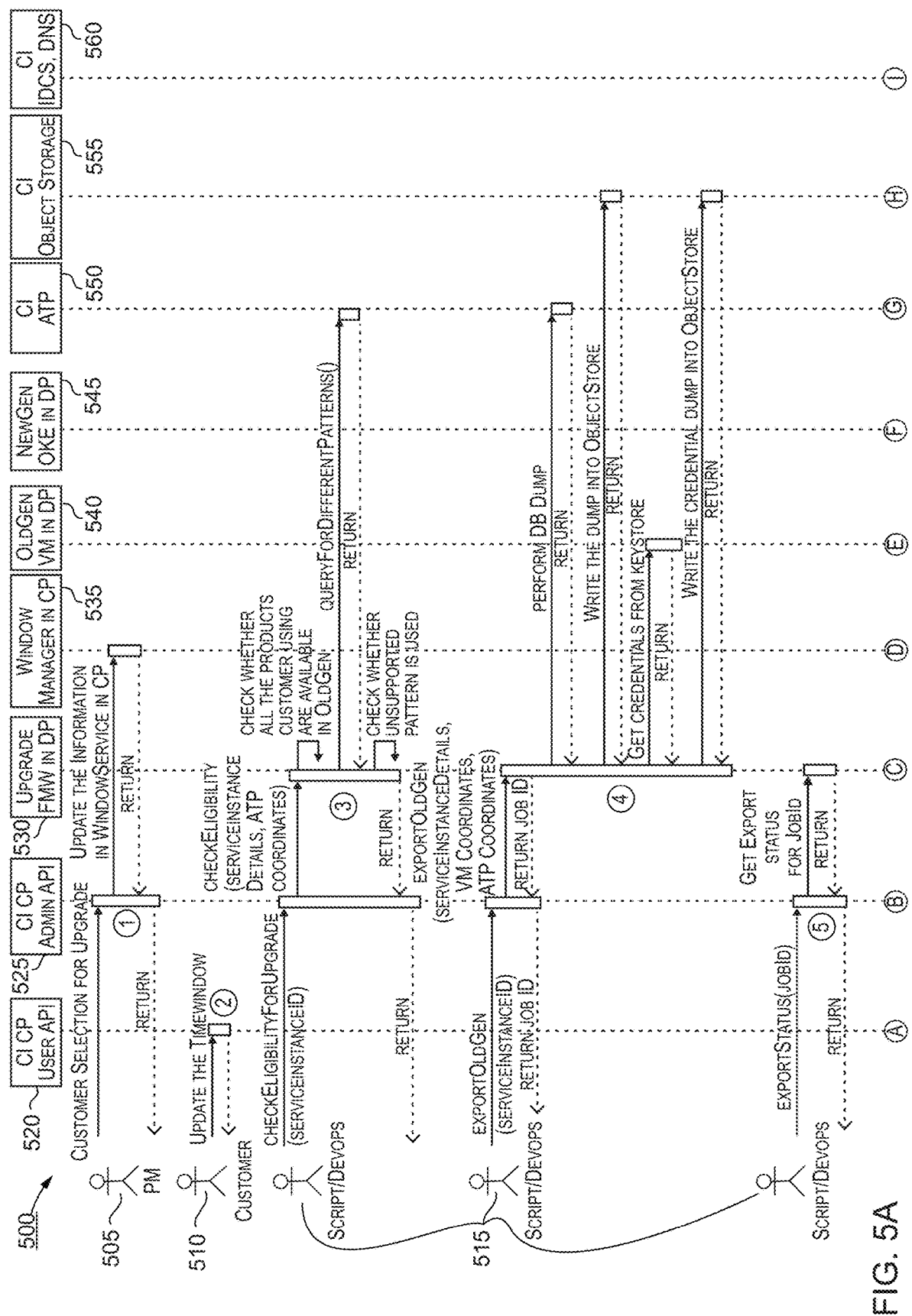
FIGS. 5A and 5B are a swimlane graph that illustrates an upgrading process in accordance with various embodiments.
Figure 5B:
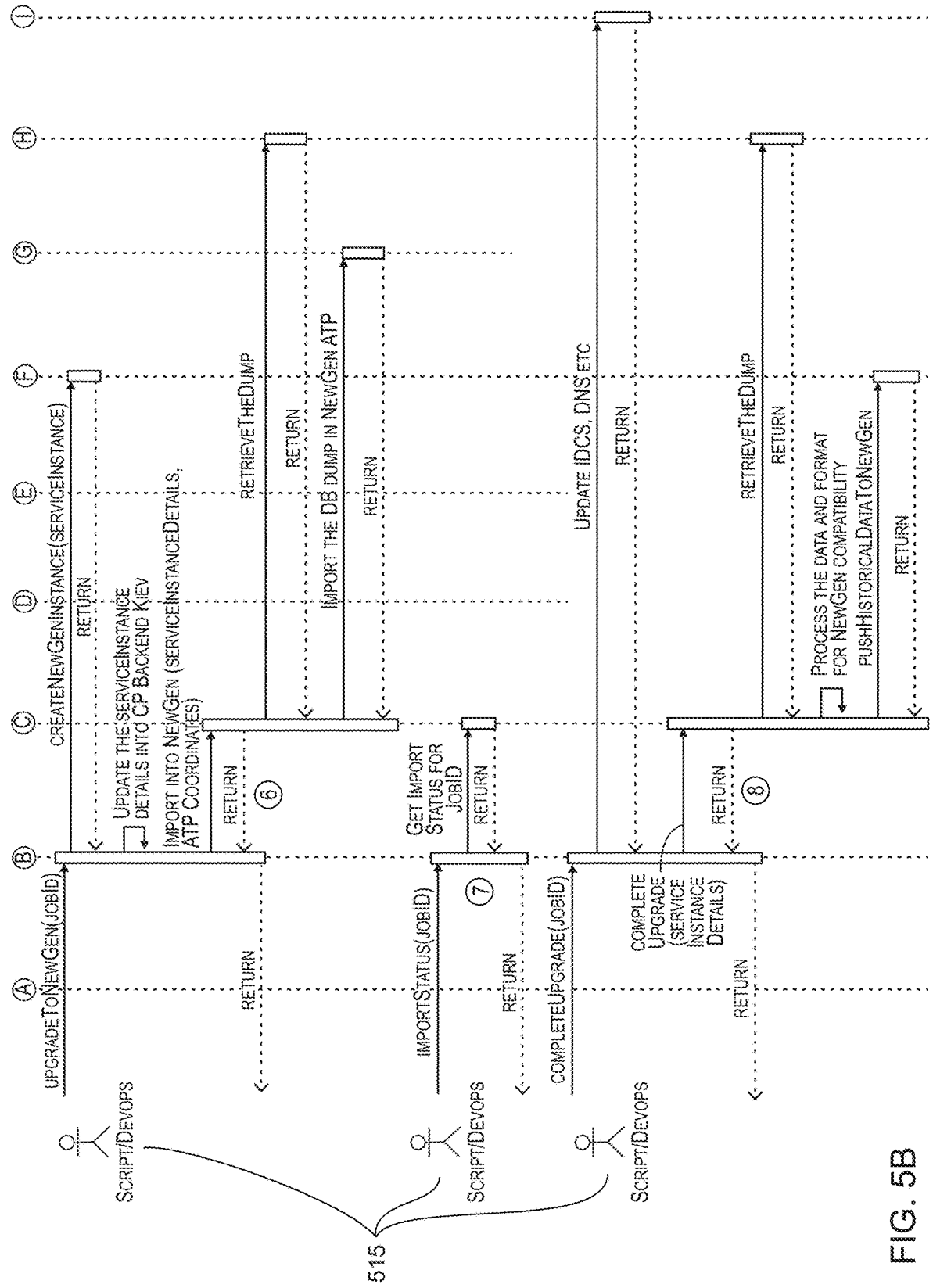

Techniques for Onboarding Users from an Older Version of a Cloud Service to a Newer Version of the Cloud Service FIGS. 5A and 5B show a swim lane graph that illustrates an upgrading process 500 using the disclosed technologies (e.g., framework 400 described with respect to FIGS. 4A and 4B) and parties/services/subsystems involved in accordance with various embodiments. The parties/services/subsystems include a project management system (PM) 505, a user (or customer) 510, and a control system 515 (e.g., Script/Devops a combination of scripting techniques with DevOps practices, where DevOps is a set of principles and practices that aim to improve collaboration and efficiency between development (Dev) and operations (Ops) teams in a software development lifecycle). The vertical axis of FIGS. 5A and 5B illustrates related parties/services/subsystems, and the horizontal axis of FIGS. 5A and 5B illustrates different components/technologies of the upgrading process.

The PM 505 refers to a computing system capable of automatically performing the operations or a person manually using the computing system to perform the operations. The PM 505 oversees selecting a customer for an upgrade via API 525 at step ①. If a customer is not eligible for the upgrade, a "fail" result may be returned to the PM. Otherwise, information may be updated in a service of a control plane 535. In some instances, the service in the control plane 535 is a background process or program running on an operating system that provides specific functionality or performs specific tasks related to the control plane operations. The service may be run continuously in the background and does not require user interaction. The specific functionality of a service in the control plane 535 can vary depending on the cloud service or infrastructure being referred to, including but not limited to: resource provisioning, service monitoring, access control and security, and/or service orchestration and automation. In some instances, the updated information is returned to the PM 505 via API 525.

As disclosed herein, the techniques require minimal user input. In some instances, the user 510 may interact with the upgrading process by requesting for an upgrade and/or updating a time window for the upgrading process via API 520 at step ②. For example, the user 510 may schedule or reschedule a predetermined date or time slot for the upgrading process.

The control system 515 generally executed various tasks (i.e., DAG tasks as described in detail with respect to FIGS. 4A and 4B) in the upgrading process. The control system 515 is responsible for checking the eligibility status for the upgrade via API 525, Framework (FMW) 530, and ATP 550 at step ③. The FMW 530 is the upgrade framework running in the older version of the cloud environment. The FMW 530 accepts the request for precheck, export and orchestrates using other downstream systems. The eligibility check includes: (i) obtaining via the FMW 530 the service instance details and/or ATP coordinates for the old generation instance in the data plane, (ii) checking via the FMW 530 whether all products that the user are using are available in the new generation instance, (iii) querying the ATP 550 for different patterns based on the service instance details and/or ATP coordinates for the old generation instance, and (iv) checking whether an unsupported pattern is used in the old generation instance. Patterns refer to what integration patterns are being used by the user like MapMyData, PubSub, Orchestration, and Scheduled Orchestration. Using the query to ATP the control system 515 will identify whether the user is using any of the pattern that is not supported by the new generation service instance or environment. The results of these checks are then used to check eligibility of the old generation service instance for the upgrade to the new generation service instance.

The control system 515 is also responsible for exporting data from the old generation service instance to the common storage 555 via API 525, FMW 530, VM 540, and ATP 550 at step ④. The service instance details, VM instance IP address, and ATP coordinates are retrieved from the CP Admin API 525 and passed to the Upgrade FMW 530 and in turn, the Upgrade framework in database (DB) will use the coordinates to start exporting the details. The data export includes: (i) obtaining via the FMW 530 the service instance details, VM coordinates, and/or ATP coordinates for the old generation instance in the data plane, (ii) performing a DB dump via the ATP 550 (i.e., obtaining the data used with the old generation instance), (iii) writing the database dump into the common storage 555 (i.e., exporting the data used with the old generation instance to the common storage), (iv) obtaining credentials for the data dump from the keystore of VM 540, and (v) writing the credentials for the data dump into the common storage 555. The credentials are user configured credentials in the older version of the cloud environment, and the internal WebLogic server commands are being used to export the credentials, zip and encrypt them before pushing them into the object storage. The results of the exporting of the data are returned as a job identifier to the control system 515.

The control system 515 is also responsible for obtaining a status of the exporting of the data from the old generation service instance based on the job identifier via the API 525 and FMW 530 at step ⑤.

The control system 515 is also responsible for creating the new generation instance and importing the data from common storage 555 to the new generation instance via API 525, FMW 530, Oracle Kubernetes Engine (OKE) 545—used to create newer instances in a multi-tenant environment, ATP 550, and IDCS/DNS 560 at step ⑥. The creation of the new generation instance includes: (i) creating via the API 525 and the OKE 545 the new generation instance in the data plane, (ii) updating the service instance details (e.g., the service instance ID or OCID, admin email, customer tenancy details, associated service details, etc.) into the control plane backend kiev via the API 525, and (iii) updating the new generation instance with the service instance details and ATP coordinates via the FMW 530. More specifically, in the newer generation instance, a component called the Extended Control plane sits within the data plane and this component accepts a request for a new service instance creation, once it receives the request it will onboard the user by creating a stripe in the new generation environment. The creation of stripe includes creating a new ATP schema, creating a dedicated object storage bucket, etc. Once the ATP schema is available, the upgrade framework will start the work of pulling the database dump from the common storage 555 and use the data pump feature to insert data into the ATP schema, and then the upgrade framework performs other activities such as reading the credentials from the common storage 555 and creating connections, creating the runtime artifacts, etc. The importing of the data from common storage 555 to the new generation instance includes: (i) retrieving the data dump from the common storage 555 and (ii) importing the data dump into the new generation instance via the ATP 550. The results of the importing of the data are returned as a job identifier to the control system 515.

The control system 515 is also responsible for obtaining a status of the importing of the data into the new generation service instance based on the job identifier via the API 525 and FMW 530 at step ⑦.

The control system 515 is also responsible for updating the IDCS and DNS entries and performing the delta check via API 525, FMW 530, OKE 545, and IDCS/DNS 560 at step ⑧. The IDCS and DNS entries are updated via the API 525 and the IDCS/DNS 560. The updating includes: (i) pointing the DNS to the new generation instance and (ii) updating the user's security credentials for the new generation instance. The delta check is performed via the API 525, FMW 530, and OKE 545. The delta check includes: (i) retrieving the data dump from the common storage 555, (ii) comparing the data dump to the data in the old generation instance using mirror tables, (iii) determining the delta data based on the comparing, (iv) processing the delta data and format thereof for compatibility with the new generation instance, and (v) importing the processed delta data into the new generation instance. Essentially, the runtime historical data format is different between the older generation instance and the newer generation instance. The older generation runtime historical data will be in the database and the newer generation runtime historical data are in the elastic search, so the historical data is converted from the older format to newer format and then pushed to elastic search. The results of updating the IDCS and DNS entries and importing of the delta data are returned as a job identifier to the control system 515.

Figure 6:
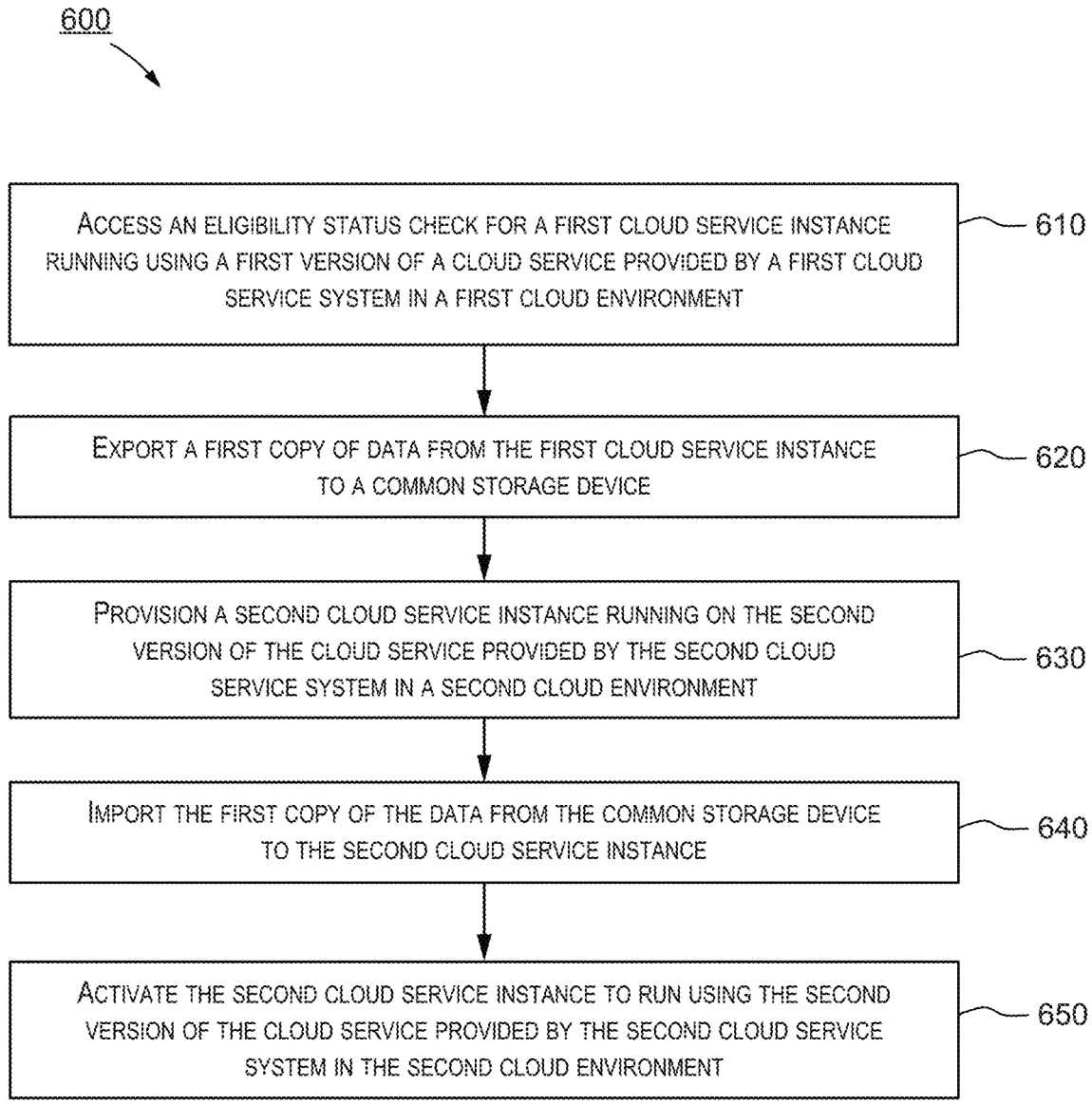
FIG. 6 is an exemplary flowchart showing a process of upgrading a cloud service in accordance with various embodiments.

FIG. 6 depicts a simplified flowchart 600 depicting techniques for onboarding users from an older version of a cloud service to a newer version of the cloud service according to various embodiments. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The techniques presented in FIG. 6 and described below are intended to be illustrative and non-limiting. Although FIG.

6 depicts the various processing steps occurring in a particular sequence or order, this is not intended to be limiting. In certain alternative embodiments, the steps may be performed in some different order or some steps may also be performed in parallel.

Process 600 begins at step 610, where an eligibility status check is accessed for a first cloud service instance running using a first version of a cloud service provided by a first cloud service system in a first cloud environment. In some embodiments, the eligibility status check indicates that the first cloud service instance is eligible for an upgrade from the first version of the cloud service to a second version of the cloud service provided by a second cloud service system. In some embodiments, the first cloud environment is a single tenant environment. A single tenant environment provides each user with a distinct software instance running on infrastructure that is not shared with other users. For example, in the single tenant environment, while each user's data is isolated from the other users, each user is also given their own virtual machine, with their own database, and the like such that each user has their own isolated environment, giving them greater flexibility than shared infrastructure models.

The eligibility of the first cloud service instance for the upgrade may be determined based on the application of rules to determine whether various aspects of the first cloud service instance pass or fail an eligibility test. The eligibility status check may be performed and determined prior to accessing the eligibility status check using the same computing or cloud service system. In some embodiments, the determining comprises applying rules to determine whether various aspects of the first cloud service instance pass or fail an eligibility test and determining the eligibility status check for the first cloud service instance based on the applying the rules. In some embodiments, each of the various aspects can be toggled on or off to control whether each aspect will be used for the determining eligibility of the first cloud service instance for the upgrade. In some embodiments, the eligibility status check is informative of: (i) an agent version; (ii) a maximum active integration; (iii) a manual status; (iv) an adapter status; (v) a customer endpoint status; (vi) a response status, (vii) agent Java version, (viii) unsupported adapters, (ix) allowlist, (x) custom endpoint(s). or (xi) any combination thereof.

In some instances, in response to the eligibility status check indicating that the first cloud service instance is eligible for the upgrade, a service agent is provisioned in an on-premise environment of a user. The service agent is connected to both the first cloud service system and the second cloud service system for facilitating the exporting (step 620), the provisioning (step 630), the importing (step 640), and the activating (step 650).

At step 620, a first copy of data is exported from the first cloud service instance to a common storage device. The exporting is performed in response to the eligibility status check indicating that the first cloud service instance is eligible for the upgrade. In some embodiments, the first copy of data covers all data used and/or stored in the first cloud service instances. In other embodiments, the first copy of data is a subset of all data used and/or stored in the first cloud service instances. The common storage device is accessible by the first cloud service system and the second cloud service system. The common storage device may be cloud storage devices such as (a) Hard Disk Drives (HDD), which consist of spinning magnetic disks and are cost-effective for storing large amounts of data, (b) Solid State Drives (SSD), which use flash memory to store data, resulting in improved read and write speeds, (c) Network Attached Storage (NAS), which provides file-level storage and can be accessed by multiple users simultaneously, (d) Storage Area Networks (SAN), a high-performance storage architecture that enables block-level data storage and retrieval, or (e) Object Storage, which stores data as objects, along with associated metadata, in a flat address space. Object storage may be preferred in certain instances for offering scalability, durability, and fault tolerance, making it suitable for storing large volumes of unstructured data in the cloud.

At step 630, a second cloud service instance running on the second version of the cloud service provided by the second cloud service system is provisioned in a second cloud environment. In some embodiments, the second cloud environment is a multi-tenant environment. A multi-tenant environment is where a single software instance and its supporting infrastructure are shared among two or more users (tenants) at the same time. For example, in the multi-tenant environment, while each user's data is isolated from the other users, the users share with each other the virtual machine, database, and the like such that all users are physically integrated but logically separated. Although, the processes described herein may pertain to a particular instance where users are being onboarded from an older version of a cloud service in a single tenant environment to a newer version of the cloud service in a multi-tenant environment, it should be understood that these process are equally applicable to onboarded users from an older version of a cloud service in a single tenant environment or multi-tenant environment to a newer version of the cloud service in a single tenant environment or multi-tenant environment.

At step 640, the first copy of the data from the common storage device is imported to the second cloud service instance. During the exporting (step 620), the provisioning (step 630), and the importing (step 640) the first cloud service instance may continue to run using the first version of the cloud service provided by the first cloud service system.

At step 650, the second cloud service instance is activated to run using the second version of the cloud service provided by the second cloud service system in the second cloud environment. In some embodiments, the activating comprises redirecting access of a user from the first cloud service instance to the second cloud service instance. In some embodiments, the activating further comprises obtaining a second copy of data from the first cloud service instance, comparing the first copy of the data to the second copy of the data, determining one or more changes made to the first copy of the data based on the comparing, and/or applying the one or more changes to the first copy of the data in the second cloud service instance.

In some embodiments, the redirecting comprises changing an address for the cloud service in a Domain Name System (DNS) from a first address pointing to the first cloud service instance to a second address pointing to the second cloud service instance.

In some embodiments, the exporting (step 620), the provisioning (step 630), the importing (step 640), and the activating (step 650) are implemented by a scheduler that monitors tasks and directed acyclic graphs (DAGs) associated with each of the exporting (step 620), the provisioning (step 630), the importing (step 640), and the activating (step 650), and triggers, based on the monitoring, task instances once dependencies of the task instances are complete.

A user may interact with process 600. In some embodiments, in response to a request from the user, an action is triggered and executes to (i) delete the first cloud service instance, or (ii) redirect an access of the user from the second cloud service instance back to the first cloud service instance.

As illustrated in detail herein, there is a variety of advantages in using the present techniques to upgrade a cloud/cloud service system. First, the techniques disclosed herein achieve a minimal downtime compared with other upgrading methods in the art. The goal of achieving the minimal downtime is accomplished using a migration framework with three different phases (precheck, brownout, and blackout). The only service interruption is in the blackout phase, which is limited to about 15 minutes. An additional post upgrade phase ensures that a user is satisfied with the upgrading process and the upgraded cloud environment. The post upgrade phase also maintains the capability of roll-back in case the user would like to change back to the old generation.

Additionally, the eligibility check performed in the precheck phase is computational and economical efficient. It not only avoids the unnecessary cycle of upgrade-fail-upgrade but also offers the opportunity to anticipate potential upgrade outcomes in advance, significantly increasing the likelihood of a successful upgrade. Additionally, the togglable or pluggable nature of each eligibility check item is also advanced comparing to conventional methods, which allows the eligibility check items to be toggled dynamically and surpasses conventional approaches, enabling dynamic toggling of these items. This flexibility allows for the disabling of specific items when certain features are supported in the upgraded cloud environment.

Moreover, conventional upgrading methods do not have the involvement of an on-premise agent. The disclosed techniques provide a seamless upgrade experience with upgrading the on-premise agent as well along with the cloud upgrade without any intervention from users. The on-premise agent directly talks to the cloud product using application identifications and credentials, retaining the same credentials during pre-upgrading, upgrading, and post-upgrading processes. The limitations associated with the on-premise agent's restricted communication capability solely with old generation products have been overcome through the orchestration of the upgrade process. By enabling communication with both the old and new generations of products, the upgrade is seamlessly executed, resolving any previous constraints.

Furthermore, the whole upgrading process can be achieved in an automatic flow system. A scheduler may be created to use simple cvs files and DAGs to invoke any process/step in the upgrading process. It can upgrade thousands of users with about tens of thousands of instances with minimal downtime that happens automatically and scales well.

Illustrative Systems

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
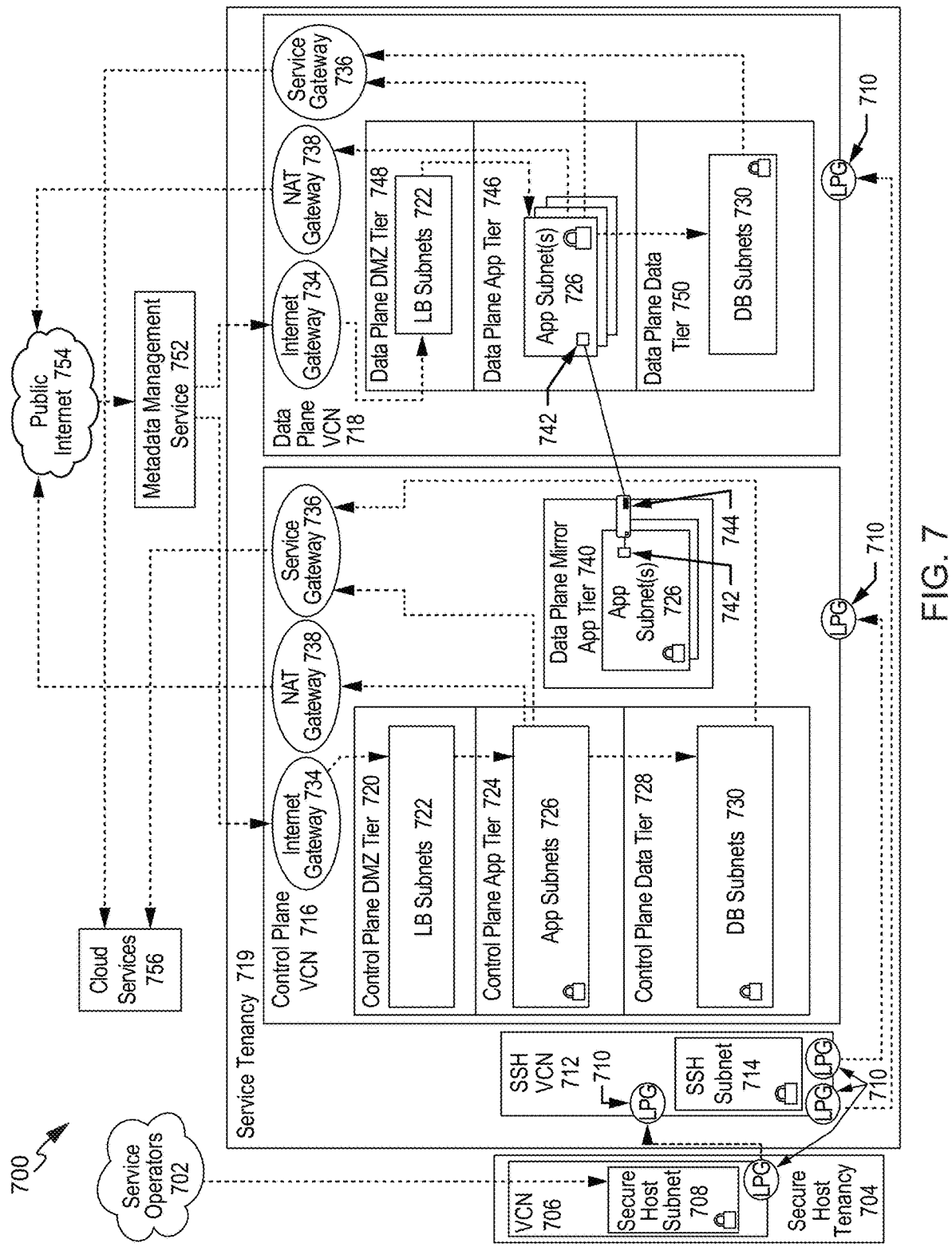
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Metadata that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
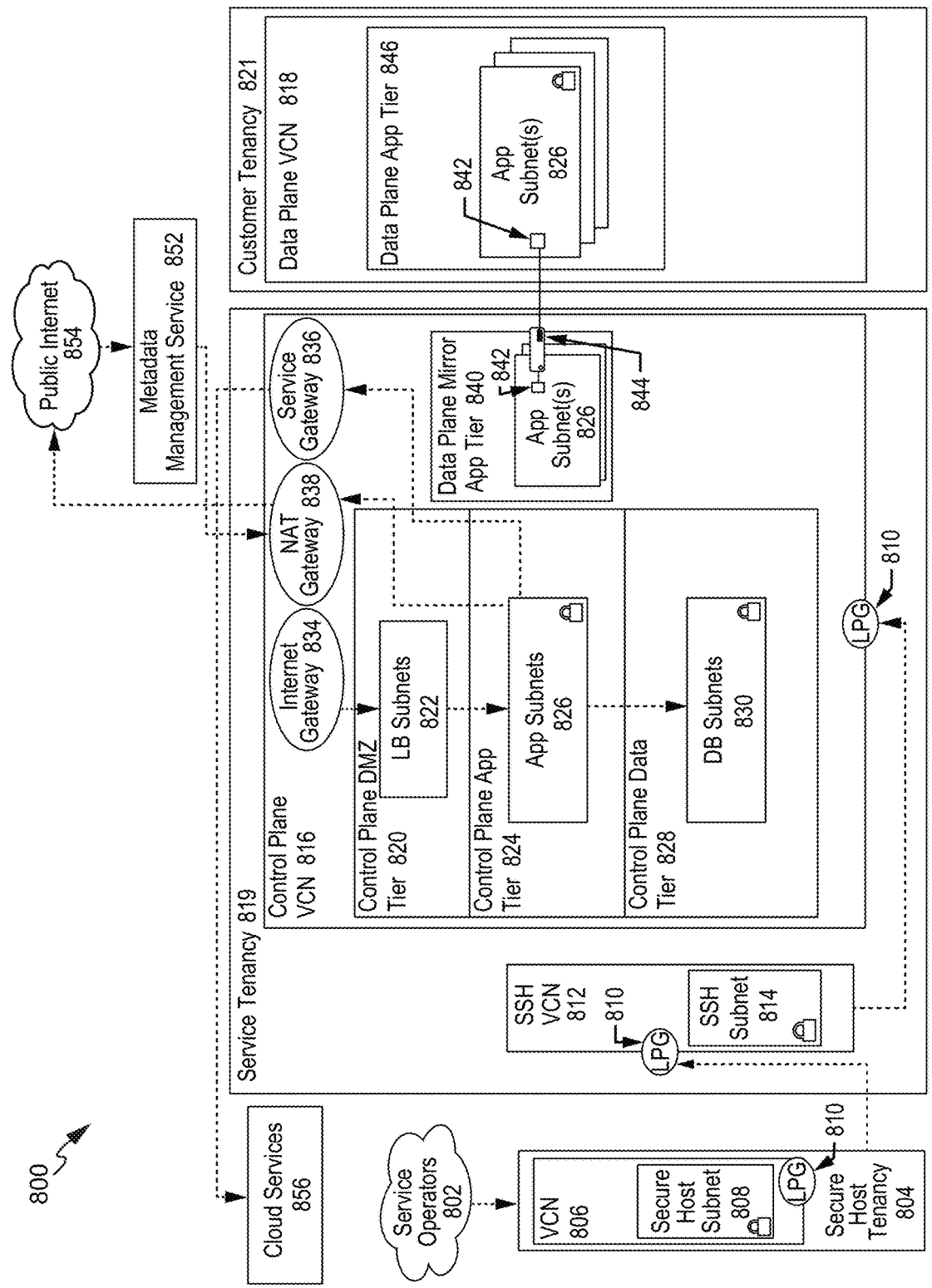
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 702 of FIG. 7) can be communicatively coupled to a secure host tenancy 804 (e.g., the secure host tenancy 704 of FIG. 7) that can include a virtual cloud network (VCN) 806 (e.g., the VCN 706 of FIG. 7) and a secure host subnet 808 (e.g., the secure host subnet 708 of FIG. 7). The VCN 806 can include a local peering gateway (LPG) 810 (e.g., the LPG 710 of FIG. 7) that can be communicatively coupled to a secure shell (SSH) VCN 812 (e.g., the SSH VCN 712 of FIG. 7) via an LPG 710 contained in the SSH VCN 812. The SSH VCN 812 can include an SSH subnet 814 (e.g., the SSH subnet 714 of FIG. 7), and the SSH VCN 812 can be communicatively coupled to a control plane VCN 816 (e.g., the control plane VCN 716 of FIG. 7) via an LPG 810 contained in the control plane VCN 816. The control plane VCN 816 can be contained in a service tenancy 819 (e.g., the service tenancy 719 of FIG. 7), and the data plane VCN 818 (e.g., the data plane VCN 718 of FIG. 7) can be contained in a customer tenancy 821 that may be owned or operated by users, or customers, of the system.

The control plane VCN 816 can include a control plane DMZ tier 820 (e.g., the control plane DMZ tier 720 of FIG. 7) that can include LB subnet(s) 822 (e.g., LB subnet(s) 722 of FIG. 7), a control plane app tier 824 (e.g., the control plane app tier 724 of FIG. 7) that can include app subnet(s) 826 (e.g., app subnet(s) 726 of FIG. 7), a control plane data tier 828 (e.g., the control plane data tier 728 of FIG. 7) that can include database (DB) subnet(s) 830 (e.g., similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g., the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g., the service gateway 736 of FIG. 7) and a network address translation (NAT) gateway 838 (e.g., the NAT gateway 738 of FIG. 7). The control plane VCN 816 can include the service gateway 836 and the NAT gateway 838.

The control plane VCN 816 can include a data plane mirror app tier 840 (e.g., the data plane mirror app tier 740 of FIG. 7) that can include app subnet(s) 826. The app subnet(s) 826 contained in the data plane mirror app tier 840 can include a virtual network interface controller (VNIC) 842 (e.g., the VNIC of 742) that can execute a compute instance 844 (e.g., similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g., the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g., the metadata management service 752 of FIG. 7) that can be communicatively coupled to public Internet 854 (e.g., public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g., cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
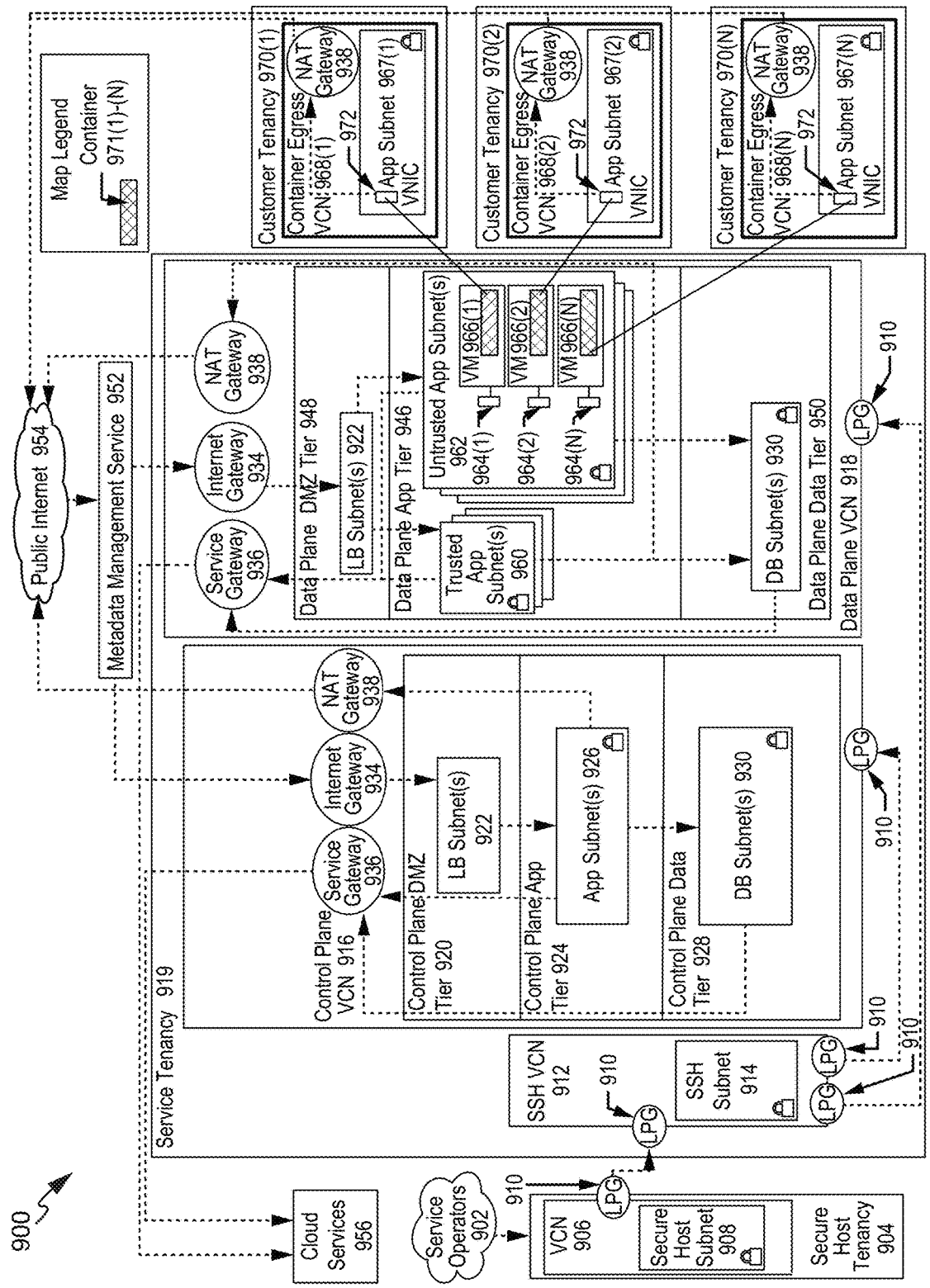
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 702 of FIG. 7) can be communicatively coupled to a secure host tenancy 904 (e.g., the secure host tenancy 704 of FIG. 7) that can include a virtual cloud network (VCN) 906 (e.g., the VCN 706 of FIG. 7) and a secure host subnet 908 (e.g., the secure host subnet 708 of FIG. 7). The VCN 906 can include an LPG 910 (e.g., the LPG 710 of FIG. 7) that can be communicatively coupled to an SSH VCN 912 (e.g., the SSH VCN 712 of FIG. 7) via an LPG 910 contained in the SSH VCN 912. The SSH VCN 912 can include an SSH subnet 914 (e.g., the SSH subnet 714 of FIG. 7), and the SSH VCN 912 can be communicatively coupled to a control plane VCN 916 (e.g., the control plane VCN 716 of FIG. 7) via an LPG 910 contained in the control plane VCN 916 and to a data plane VCN 918 (e.g., the data plane 718 of FIG. 7) via an LPG 910 contained in the data plane VCN 918. The control plane VCN 916 and the data plane VCN 918 can be contained in a service tenancy 919 (e.g., the service tenancy 719 of FIG. 7).

The control plane VCN 916 can include a control plane DMZ tier 920 (e.g., the control plane DMZ tier 720 of FIG. 7) that can include load balancer (LB) subnet(s) 922 (e.g., LB subnet(s) 722 of FIG. 7), a control plane app tier 924 (e.g., the control plane app tier 724 of FIG. 7) that can include app subnet(s) 926 (e.g., similar to app subnet(s) 726 of FIG. 7), a control plane data tier 928 (e.g., the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g., the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 7) and a network address translation (NAT) gateway 938 (e.g., the NAT gateway 738 of FIG. 7). The control plane VCN 916 can include the service gateway 936 and the NAT gateway 938.

The data plane VCN 918 can include a data plane app tier 946 (e.g., the data plane app tier 746 of FIG. 7), a data plane DMZ tier 948 (e.g., the data plane DMZ tier 748 of FIG. 7), and a data plane data tier 950 (e.g., the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g., public Internet 754 of FIG. 7).

The Internet gateway 934 contained in the control plane VCN 916 and contained in the data plane VCN 918 can be communicatively coupled to a metadata management service 952 (e.g., the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
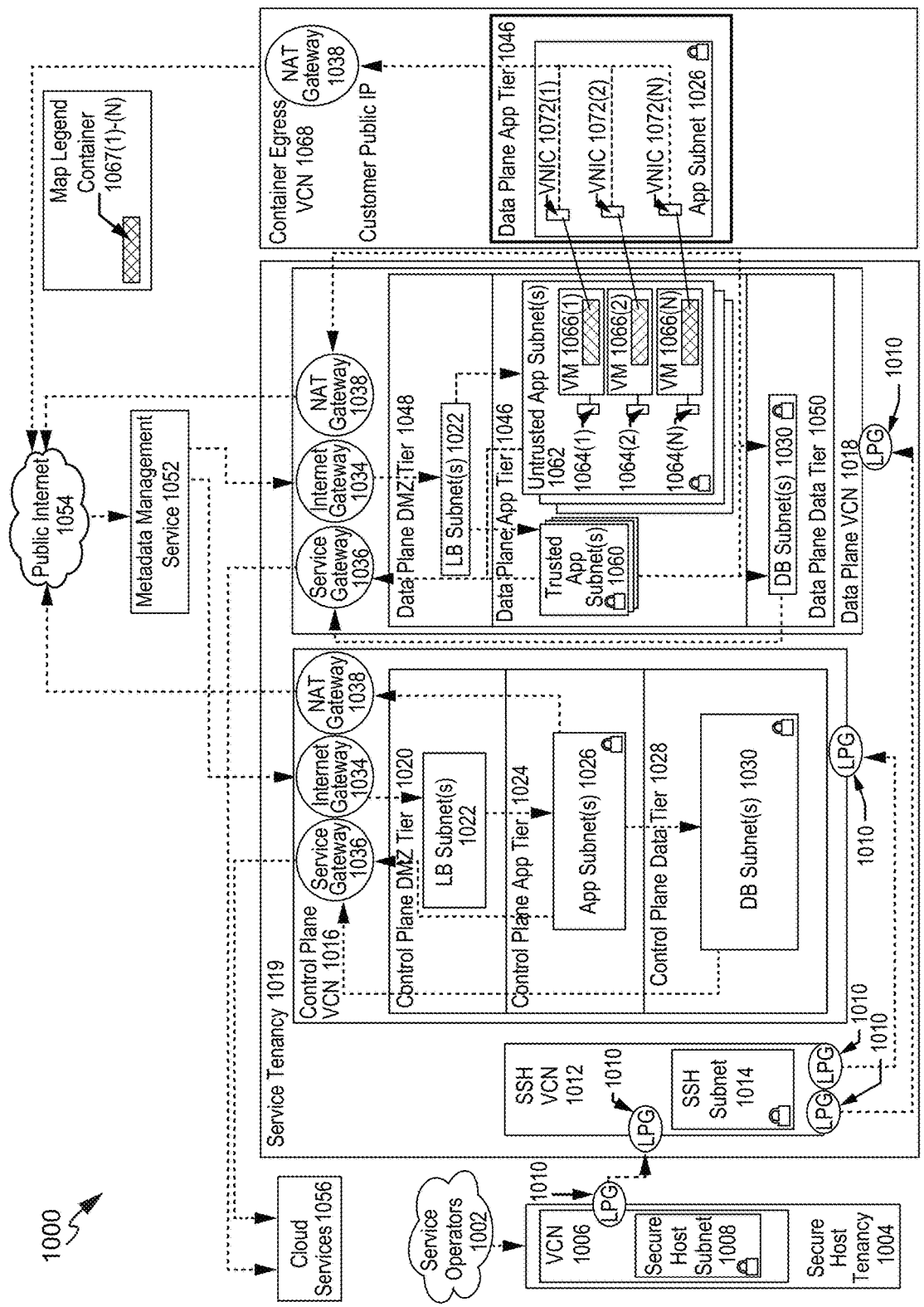
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 702 of FIG. 7) can be communicatively coupled to a secure host tenancy 1004 (e.g., the secure host tenancy 704 of FIG. 7) that can include a virtual cloud network (VCN) 1006 (e.g., the VCN 706 of FIG. 7) and a secure host subnet 1008 (e.g., the secure host subnet 708 of FIG. 7). The VCN 1006 can include an LPG 1010 (e.g., the LPG 710 of FIG. 7) that can be communicatively coupled to an SSH VCN 1012 (e.g., the SSH VCN 712 of FIG. 7) via an LPG 1010 contained in the SSH VCN 1012. The SSH VCN 1012 can include an SSH subnet 1014 (e.g., the SSH subnet 714 of FIG. 7), and the SSH VCN 1012 can be communicatively coupled to a control plane VCN 1016 (e.g., the control plane VCN 716 of FIG. 7) via an LPG 1010 contained in the control plane VCN 1016 and to a data plane VCN 1018 (e.g., the data plane 718 of FIG. 7) via an LPG 1010 contained in the data plane VCN 1018. The control plane VCN 1016 and the data plane VCN 1018 can be contained in a service tenancy 1019 (e.g., the service tenancy 719 of FIG. 7).

The control plane VCN 1016 can include a control plane DMZ tier 1020 (e.g., the control plane DMZ tier 720 of FIG. 7) that can include LB subnet(s) 1022 (e.g., LB subnet(s) 722 of FIG. 7), a control plane app tier 1024 (e.g., the control plane app tier 724 of FIG. 7) that can include app subnet(s) 1026 (e.g., app subnet(s) 726 of FIG. 7), a control plane data tier 1028 (e.g., the control plane data tier 728 of FIG. 7) that can include DB subnet(s) 1030 (e.g., DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 7) and a network address translation (NAT) gateway 1038 (e.g., the NAT gateway 738 of FIG. 7). The control plane VCN 1016 can include the service gateway 1036 and the NAT gateway 1038.

The data plane VCN 1018 can include a data plane app tier 1046 (e.g., the data plane app tier 746 of FIG. 7), a data plane DMZ tier 1048 (e.g., the data plane DMZ tier 748 of FIG. 7), and a data plane data tier 1050 (e.g., the data plane data tier 750 of FIG. 7). The data plane DMZ tier 1048 can include LB subnet(s) 1022 that can be communicatively coupled to trusted app subnet(s) 1060 (e.g., trusted app subnet(s) 960 of FIG. 9) and untrusted app subnet(s) 1062 (e.g., untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g., public Internet 754 of FIG. 7).

The Internet gateway 1034 contained in the control plane VCN 1016 and contained in the data plane VCN 1018 can be communicatively coupled to a metadata management service 1052 (e.g., the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the OCI provided by the present assignee.

Figure 11:
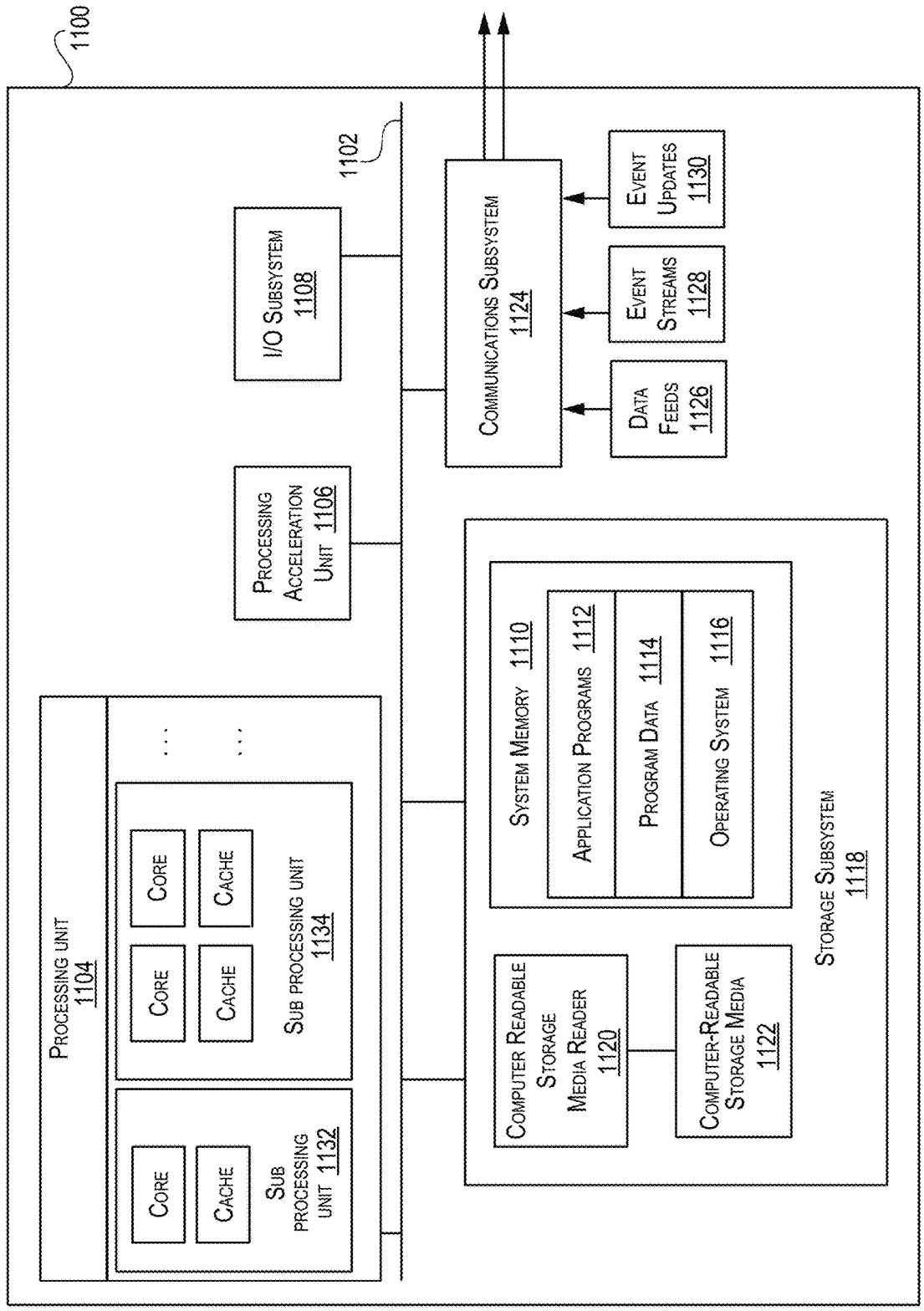
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1104 provide the functionality described above. Storage subsystem 1118 may also provide a repository for storing data used in accordance with the present disclosure.

As depicted in the example in FIG. 11, storage subsystem 1118 can include various components including a system memory 1110, computer-readable storage media 1122, and a computer readable storage media reader 1120. System memory 1110 may store program instructions that are loadable and executable by processing unit 1104. System memory 1110 may also store data that is used during the execution of the instructions and/or data that is generated during the execution of the program instructions. Various different kinds of programs may be loaded into system memory 1110 including but not limited to client applications, Web browsers, mid-tier applications, relational database management systems (RDBMS), virtual machines, containers, etc.

System memory 1110 may also store an operating system 1116. Examples of operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1100 executes one or more virtual machines, the virtual machines along with their guest operating systems (GOSs) may be loaded into system memory 1110 and executed by one or more processors or cores of processing unit 1104.

System memory 1110 can come in different configurations depending upon the type of computer system 1100. For example, system memory 1110 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1110 may include a basic input/output system (BIOS) containing basic routines that help to transfer information between elements within computer system 1100, such as during start-up.

Computer-readable storage media 1122 may represent remote, local, fixed, and/or removable storage devices plus storage media for temporarily and/or more permanently containing, storing, computer-readable information for use by computer system 1100 including instructions executable by processing unit 1104 of computer system 1100.

Computer-readable storage media 1122 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Machine-readable instructions executable by one or more processors or cores of processing unit 1104 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
accessing, by a computing system, an eligibility status check for a first cloud service instance running a first version of a cloud service provided by a first cloud service system in a first cloud environment, wherein the eligibility status check indicates that the first cloud service instance is eligible for an upgrade from the first version of the cloud service to a second version of the cloud service provided by a second cloud service system;
in response to the eligibility status check indicating that the first cloud service instance is eligible for the upgrade, exporting, by the computing system, a first copy of data from the first cloud service instance to a common storage device, wherein the common storage device is accessible by the first cloud service system and the second cloud service system;
provisioning, by the computing system, a second cloud service instance running on the second version of the cloud service provided by the second cloud service system in a second cloud environment, wherein the first cloud environment is a different type of environment from that of the second cloud environment;
importing, by the computing system, the first copy of the data from the common storage device to the second cloud service instance, wherein during the exporting, the provisioning, and the importing the first cloud service instance continues to run the first version of the cloud service; and
activating, by the computing system, the second cloud service instance to run using the second version of the cloud service provided by the second cloud service system in the second cloud environment, wherein the activating comprises redirecting access of a user from the first cloud service instance to the second cloud service instance.

2. The computer-implemented method of claim 1, wherein the activating further comprises obtaining a second copy of data from the first cloud service instance, comparing the first copy of the data to the second copy of the data, determining one or more changes made to the first copy of the data based on the comparing, and applying the one or more changes to the first copy of the data in the second cloud service instance.

3. The computer-implemented method of claim 1, wherein the redirecting comprises changing an address for the cloud service in a Domain Name System from a first address pointing to the first cloud service instance to a second address pointing to the second cloud service instance.

4. The computer-implemented method of claim 1, further comprising determining, by the computing system, eligibility of the first cloud service instance for the upgrade from the first version of the cloud service to the second version of the cloud service, wherein the determining comprises applying rules to determine whether various aspects of the first cloud service instance pass or fail an eligibility test and determining the eligibility status check for the first cloud service instance based on the applying the rules, and wherein each of the various aspects can be toggled on or off to control whether each aspect will be used for the determining the eligibility of the first cloud service instance for the upgrade.

5. The computer-implemented method of claim 1, further comprising in response to the eligibility status check indicating that the first cloud service instance is eligible for the upgrade, provisioning, by the computing system, a service agent in an on-premise environment of the user, wherein the service agent is connected to both the first cloud service system and the second cloud service system for facilitating the exporting, the provisioning, the importing, and the activating.

6. The computer-implemented method of claim 1, wherein the exporting, the provisioning, the importing, and the activating are implemented by a scheduler that monitors tasks and directed acyclic graphs (DAGs) associated with each of the exporting, the provisioning, the importing, and the activating, and triggers, based on the monitoring, task instances once dependencies of the task instances are complete.

7. The computer-implemented method of claim 1, wherein the first cloud environment is a single tenant environment, and the second cloud environment is a multi-tenant environment.

8. A system comprising:
one or more processors; and
one or more computer-readable media storing instructions which, when executed by the one or more processors, cause the system to perform operations comprising:

accessing an eligibility status check for a first cloud service instance running a first version of a cloud service provided by a first cloud service system in a first cloud environment, wherein the eligibility status check indicates that the first cloud service instance is eligible for an upgrade from the first version of the cloud service to a second version of the cloud service provided by a second cloud service system;

in response to the eligibility status check indicating that the first cloud service instance is eligible for the upgrade, exporting a first copy of data from the first cloud service instance to a common storage device, wherein the common storage device is accessible by the first cloud service system and the second cloud service system;

provisioning a second cloud service instance running on the second version of the cloud service provided by the second cloud service system in a second cloud environment, wherein the first cloud environment is a different type of environment from that of the second cloud environment;

importing the first copy of the data from the common storage device to the second cloud service instance, wherein during the exporting, the provisioning, and the importing the first cloud service instance continues to run the first version of the cloud service; and activating the second cloud service instance to run using the second version of the cloud service provided by the second cloud service system in the second cloud environment, wherein the activating comprises redirecting access of a user from the first cloud service instance to the second cloud service instance.

9. The system of claim 8, wherein the activating further comprises obtaining a second copy of data from the first cloud service instance, comparing the first copy of the data to the second copy of the data, determining one or more changes made to the first copy of the data based on the comparing, and applying the one or more changes to the first copy of the data in the second cloud service instance.

10. The system of claim 8, wherein the redirecting comprises changing an address for the cloud service in a Domain Name System from a first address pointing to the first cloud service instance to a second address pointing to the second cloud service instance.

11. The system of claim 8, wherein the operations further comprise determining eligibility of the first cloud service instance for the upgrade from the first version of the cloud service to the second version of the cloud service, wherein the determining comprises applying rules to determine whether various aspects of the first cloud service instance pass or fail an eligibility test and determining the eligibility status check for the first cloud service instance based on the applying the rules, and wherein each of the various aspects can be toggled on or off to control whether each aspect will be used for the determining the eligibility of the first cloud service instance for the upgrade.

12. The system of claim 8, wherein the operations further comprise in response to the eligibility status check indicating that the first cloud service instance is eligible for the upgrade, provisioning a service agent in an on-premise environment of the user, wherein the service agent is connected to both the first cloud service system and the second cloud service system for facilitating the exporting, the provisioning, the importing, and the activating.

13. The system of claim 8, wherein the exporting, the provisioning, the importing, and the activating are implemented by a scheduler that monitors tasks and directed acyclic graphs (DAGs) associated with each of the exporting, the provisioning, the importing, and the activating, and triggers, based on the monitoring, task instances once dependencies of the task instances are complete.

14. The system of claim 8, wherein the first cloud environment is a single tenant environment and the second cloud environment is a multi-tenant environment.

15. One or more non-transitory computer-readable media storing instructions which, when executed by one or more processors, cause a system to perform operations comprising:

accessing an eligibility status check for a first cloud service instance running a first version of a cloud service provided by a first cloud service system in a first cloud environment, wherein the eligibility status check indicates that the first cloud service instance is eligible for an upgrade from the first version of the cloud service to a second version of the cloud service provided by a second cloud service system;

in response to the eligibility status check indicating that the first cloud service instance is eligible for the upgrade, exporting a first copy of data from the first cloud service instance to a common storage device, wherein the common storage device is accessible by the first cloud service system and the second cloud service system;

provisioning a second cloud service instance running on the second version of the cloud service provided by the second cloud service system in a second cloud environment, wherein the first cloud environment is a different type of environment from that of the second cloud environment;

importing the first copy of the data from the common storage device to the second cloud service instance, wherein during the exporting, the provisioning, and the importing the first cloud service instance continues to run the first version of the cloud service; and activating the second cloud service instance to run using the second version of the cloud service provided by the second cloud service system in the second cloud environment, wherein the activating comprises redirecting access of a user from the first cloud service instance to the second cloud service instance.

16. The one or more non-transitory computer-readable media of claim 15, wherein the activating further comprises obtaining a second copy of data from the first cloud service instance, comparing the first copy of the data to the second copy of the data, determining one or more changes made to the first copy of the data based on the comparing, and applying the one or more changes to the first copy of the data in the second cloud service instance.

17. The one or more non-transitory computer-readable media of claim 15, wherein the redirecting comprises changing an address for the cloud service in a Domain Name System from a first address pointing to the first cloud service instance to a second address pointing to the second cloud service instance.

18. The one or more non-transitory computer-readable media of claim 15, wherein the operations further comprise determining eligibility of the first cloud service instance for the upgrade from the first version of the cloud service to the second version of the cloud service, wherein the determining comprises applying rules to determine whether various aspects of the first cloud service instance pass or fail an eligibility test and determining the eligibility status check for the first cloud service instance based on the applying the rules, and wherein each of the various aspects can be toggled on or off to control whether each aspect will be used for the determining the eligibility of the first cloud service instance for the upgrade.

19. The one or more non-transitory computer-readable media of claim 15, wherein the operations further comprise in response to the eligibility status check indicating that the first cloud service instance is eligible for the upgrade, provisioning a service agent in an on-premise environment of the user, wherein the service agent is connected to both the first cloud service system and the second cloud service system for facilitating the exporting, the provisioning, the importing, and the activating.

20. The one or more non-transitory computer-readable media of claim 15, wherein the exporting, the provisioning, the importing, and the activating are implemented by a scheduler that monitors tasks and directed acyclic graphs (DAGs) associated with each of the exporting, the provisioning, the importing, and the activating, and triggers, based on the monitoring, task instances once dependencies of the task instances are complete.

\* \* \* \* \*